United States Patent [19] [11] 3,760,171

Wang et al. [45] Sept. 18, 1973

[54] PROGRAMMABLE CALCULATORS HAVING DISPLAY MEANS AND MULTIPLE MEMORIES

[75] Inventors: An Wang, Lincoln; Harold Stanley Koplow, Peabody; Shu-Kuang Ho, Chelmsford, all of Mass.

[73] Assignee: Wang Laboratories, Inc., Tewksbury, Mass.

[22] Filed: Jan. 12, 1971

[21] Appl. No.: 105,875

[52] U.S. Cl. .............................. 235/156, 340/172.5
[51] Int. Cl. ......................... G06f 15/00, G06f 15/02
[58] Field of Search .................... 235/156, 159, 160, 235/164; 340/324 R, 172.5, 365 R

[56] References Cited

UNITED STATES PATENTS

| | | | |
|---|---|---|---|
| 3,389,404 | 6/1968 | Koster | 340/172.5 |
| 3,346,853 | 10/1967 | Koster et al. | 340/172.5 |
| 3,389,379 | 6/1968 | Erickson et al. | 235/168 X |
| 3,428,950 | 2/1969 | Chang et al. | 340/172.5 |
| 3,487,369 | 12/1969 | King et al. | 340/172.5 |
| 3,533,076 | 10/1970 | Perkins et al. | 340/172.5 |
| 3,588,841 | 6/1971 | Ragen | 340/172.5 |

*Primary Examiner*—Eugene G. Botz
*Assistant Examiner*—David H. Malzahn
*Attorney*—Martin Kirkpatrick

[57] ABSTRACT

A programmable desk type calculator has a display and a keyboard having a first group of keys for entering numerical values, a second group of keys for entering instructional values including subroutine designators, and a key for causing the calculator to display an extended precision result. The calculator also has a first memory for storing instructional and numerical values, a second memory for storing a plurality of fixed control words, each of which has a plurality of control fields and an arithmetic unit for operating on numerical values in accordance with a series of control words selected in response to an instructional value for producing a result which is displayed directly.

16 Claims, 13 Drawing Figures

| FIG 7a | FIG 7b |
|---|---|

FIG 7

| 300<br>Control word<br>Name | | 302<br>Control word<br>Address | | | A bus source<br>244<br>AI | B bus source<br>246<br>BI | Z bus destination<br>248<br>ZO | ALU operation<br>250<br>AOP | A control<br>252<br>AC | B control<br>254<br>BC | binary/decimal<br>256<br>BD | memory operation<br>258<br>MOP | constant field<br>260<br>KK | status<br>262<br>ST |
|---|---|---|---|---|---|---|---|---|---|---|---|---|---|---|
| PR 1-147 | | 0<br>0000 | 0<br>0000 | 0<br>0000 | 0<br>000 | 1<br>001 | 3<br>011 | 6<br>110 | 0<br>0 | 1<br>01 | 0<br>0 | D<br>1101 | F<br>1111 | D<br>1101 |
| | TWOH | | | | | | | | | | | | | |
| PR 2-149 | | 3<br>0011 | D<br>1101 | 8<br>1000 | 0<br>000 | 1<br>001 | 4<br>100 | 6<br>110 | 0<br>0 | 1<br>01 | 0<br>0 | 8<br>1000 | 1<br>0001 | 3<br>0011 |
| PR 2-150 | | 3<br>0011 | D<br>1101 | A<br>1010 | 3<br>011 | 0<br>000 | 3<br>011 | 0<br>000 | 1<br>1 | 2<br>10 | 0<br>0 | 4<br>0100 | F<br>1111 | 0<br>0000 |
| | TWOH | | | | | | | | | | | | | |
| PR 3-152 | | 3<br>0011 | D<br>1101 | 9<br>1001 | 0<br>000 | 1<br>001 | 3<br>011 | 6<br>110 | 0<br>0 | 1<br>101 | 0<br>0 | 9<br>1001 | 2<br>0010 | 2<br>0010 |
| PR 3-153 | | 3<br>0011 | D<br>1101 | B<br>1011 | 3<br>011 | 0<br>000 | 3<br>011 | 0<br>000 | 1<br>1 | 2<br>10 | 0<br>0 | 4<br>0100 | D<br>1101 | 0<br>0000 |

FIG 7a

| absolute address field | conditional address fields | | | COMMENTS | | | | |
|---|---|---|---|---|---|---|---|---|
| 264 | 266 | 268 | | 304 | 306 | 308 | 310 | 312 |
| JAD | J H | J L | | AOP | A,B,Z | MOP | Status | JUMP Add |
| 0 F 6<br>0000 1111 0110 | 1<br>001 | 0<br>000 | | MVE | =F,V | MTOFF | ZA | PR2,1 |
| | | | TWOH | | | | | |
| 0 F 6<br>0000 1111 0110 | 1<br>001 | 1<br>001 | | MVE | =1,KA | | S2 | PR3,1 |
| 0 F 6<br>0000 1111 0110 | 5<br>101 | 0<br>000 | | A | V,-,V | RD#XY | | PR2,CC |
| | | | TWOH | | | | | |
| 1 6 F<br>0001 0110 1111 | 1<br>001 | 1<br>001 | | MVE | =2,V | SETQ | S1 | UP1A |
| 0 F 6<br>0000 1111 0110 | 5<br>101 | 1<br>001 | | A | V,-,V | RD#PC | | PR3,CC |

FIG 7b

| Control word being executed | Address | 214 S | 194- T | 196- U | -198 V | 190- KA | -192 KB | 206- CA | -208 CB | 210- RA | -212 RB | 200- L | -202- M | -204 N | 236 KBD | 238 OFLO | 240 Q | 110 BL | 112 BH | Registers in Memory 3F 0123456789ABCDEF |
|---|---|---|---|---|---|---|---|---|---|---|---|---|---|---|---|---|---|---|---|---|
| PR147 | 000 | 0 | 0 | 0 | F | 0 | 0 | 0 | 0 | 0 | 0 | 0 | 0 | 0 | 1 | 0 | 0 | 0 | 1 | 0502487305143020<br>0314285714285101 |
| PR150 | 3DA | | | | E | | | 0 | 1 | 0 | 1 | 3 | F | F | | | | | | 0502487305143020<br>0314285714285100 |
| PR150 | 3DA | | | | D | | | 2 | 0 | 2 | 0 | | | E | | | | | | 0502487305143000<br>0314285714285100 |
| PR150 | 3DA | | | | C | | | 0 | 1 | 0 | 1 | | | D | | | | | | 0502487305143000<br>0314285714285000 |
| PR150 | 3DA | | | | B | | | 3 | 5 | 3 | 5 | | | C | | | | | | 0502487305140000<br>0314285714280000 |
| PR150 | 3DA | | | | A | | | 4 | 8 | 4 | 8 | | | B | | | | | | 0502487305100000<br>0314285714200000 |
| PR150 | 3DA | | | | 9 | | | 1 | 2 | 1 | 2 | | | A | | | | | | 0502487305000000<br>0314285714000000 |
| PR150 | 3DA | | | | 8 | | | 5 | 4 | 5 | 4 | | | 9 | | | | | | 0502487300000000<br>0314285710000000 |
| PR150 | 3DA | | | | 7 | | | 0 | 1 | 0 | 1 | | | 8 | | | | | | 0502487300000000<br>0314285700000000 |
| PR150 | 3DA | | | | 6 | | | 3 | 7 | 3 | 7 | | | 7 | | | | | | 0502487000000000<br>0314285000000000 |
| PR150 | 3DA | | | | 5 | | | 7 | 5 | 7 | 5 | | | 6 | | | | | | 0502480000000000<br>0314280000000000 |
| PR150 | 3DA | | | | 4 | | | 8 | 8 | 8 | 8 | | | 5 | | | | | | 0502400000000000<br>0314200000000000 |
| PR150 | 3DA | | | | 3 | | | 4 | 2 | 4 | 2 | | | 4 | | | | | | 0502000000000000<br>0314000000000000 |
| PR150 | 3DA | | | | 2 | | | 2 | 4 | 2 | 4 | | | 3 | | | | | | 0500000000000000<br>0310000000000000 |

Registers of CPU (182)

FIG 8a

| | | 214 | 194-196-198 | 190-192 | 206-208 | 210-212 | 200-202-204 | 236 | 238 | 240 | 110 | 112 | |
|---|---|---|---|---|---|---|---|---|---|---|---|---|---|
| PR150 | 3DA | | 1 | | 0 1 | 0 1 | 2 | | | | | | 0500000000000000<br>0300000000000000 |
| PR150 | 3DA | | 0 | | 5 3 | 5 3 | 1 | | | | | | 0000000000000000<br>0000000000000000 |
| PR150 | 3DA | | F | | 0 0 | 0 0 | 0 | | | | | 0 | 0000000000000000<br>0000000000000000 |
| PR149 | 3D8 | 4<br>(0100) | | 1 | | | | | | | 1 | 1 | 3D 3BF0400000000000<br>F000FFF04F08FFFF |
| PR153 | 3DB | | E | | 0 F | 0 F | D F | | | | | | 3BF0400000000000<br>F000FFF04F08FFF0 |
| PR153 | 3DB | | D | | 0 F | 0 F | E | | | | | | 3BF0400000000000<br>F000FFF04F08FF00 |
| PR153 | 3DB | | C | | 0 F | 0 F | D | | | | | | 3BF0400000000000<br>F000FFF04F08F000 |
| PR153 | 3DB | | B | | 0 F | 0 F | C | | | | | | 3BF0400000000000<br>F000FFF04F080000 |
| PR153 | 3DB | | A | | 0 8 | 0 8 | B | | | | | | 3BF0400000000000<br>F000FFF04F000000 |
| PR153 | 3DB | | 9 | | 0 0 | 0 0 | A | | | | | | 3BF0400000000000<br>F000FFF04F000000 |
| PR153 | 3DB | | 8 | | 0 F | 0 F | 9 | | | | | | 3BF0400000000000<br>F000FFF040000000 |
| PR153 | 3DB | | 7 | | 0 4 | 0 4 | 8 | | | | 1 | 1 | 3BF0400000000000<br>F000FFF000000000 |
| PR153 | 3DB | | 6 | | 0 0 | 0 0 | 7 | | | | | | 3BF0400000000000<br>F000FFF000000000 |
| PR153 | 3DB | | 5 | | 0 F | 0 F | 6 | | | | | | 3BF0400000000000<br>F000FF0000000000 |

FIG 8b

| | | 214 | 194-196-198 | 190-192 | 206-208 | 210-212 | 200-202-204 | 236 | 238 | 240 | 110 | 112 | |
|---|---|---|---|---|---|---|---|---|---|---|---|---|---|
| PR153 | 3DB | | 4 | | 0 F | 0 F | 5 | | | | | | 3BF0400000000000<br>F00F000000000000 |
| PR153 | 3DB | | 3 | | 4 F | 4 F | 4 | | | | | | 3BF0000000000000<br>F000000000000000 |
| PR153 | 3DB | | 2 | | 0 0 | 0 0 | 3 | | | | | | 3BF0000000000000<br>F000000000000000 |
| PR153 | 3DB | | 1 | | F 0 | F 0 | 2 | | | | | | 3B00000000000000<br>F000000000000000 |
| PR153 | 3DB | | 0 | | B 0 | B 0 | 1 | | | | | | 3000000000000000<br>F000000000000000 |
| PR153 | 3DB | | F | | 3 F | 3 F | 0 | | | | | 0 | 0000000000000000<br>0000000000000000 |
| PR152 | 3D9 | 6 (0110) | 2 | | | | | | | | | 1 | |
| UP1A | 5BF | | 1 | | | | 2 | | | | | 0 | |

FIG 8c

| |
|---|
| FIG 8a |
| FIG 8b |
| FIG 8c |

FIG 8

```
00 0123456789ABCDEF
   0000000000000000
   0000000000000000
01 0123456789ABCDEF
   0000000000000000
   0000000000000000
02 0123456789ABCDEF
   0000000000000000
   0000000000000000
03 0123456789ABCDEF
   0000000000000000
   0000000000000000
04 0123456789ABCDEF
   0000000000000000
   0000000000000000
05 0123456789ABCDEF
   0000000000000000
   0000000000000000
06 0123456789ABCDEF
   0000000000000000
   0000000000000000
07 0123456789ABCDEF
   0000000000000000
   0000000000000000
08 0123456789ABCDEF
   0000000000000000
   0000000000000000

10 0123456789ABCDEF
   0000000000000000
   0000000000000000
11 0123456789ABCDEF
   0000000000000000
   0000000000000000
12 0123456789ABCDEF
   0000000000000000
   0000000000000000
13 0123456789ABCDEF
   0000000000000000
   0000000000000000
14 0123456789ABCDEF
   0000000000000000
   0000000000000000
15 0123456789ABCDEF
   0000000000000000
   0000000000000000
16 0123456789ABCDEF
   0000000000000000
   0000000000000000
17 0123456789ABCDEF
   0000000000000000
   0000000000000000
18 0123456789ABCDEF
   0000000000000000
   0000000000000000

20 0123456789ABCDEF
   0000000000000000
   0000000000000000
21 0123456789ABCDEF
   0000000000000000
   0000000000000000
22 0123456789ABCDEF
   0000000000000000
   0000000000000000
23 0123456789ABCDEF
   0000000000000000
   0000000000000000
24 0123456789ABCDEF
   0000000000000000
   0000000000000000
25 0123456789ABCDEF
   0000000000000000
   0000000000000000
26 0123456789ABCDEF
   0000000000000000
   0000000000000000
27 0123456789ABCDEF
   0000000000000000
   0000000000000000
28 0123456789ABCDEF
   0000000000000000
   0000000000000000

30 0123456789ABCDEF
   0000000000000000
   0000000000000000
31 0123456789ABCDEF
   0000000000000000
   0000000000000000
32 0123456789ABCDEF
   0000000000000000
   0000000000000000
33 0123456789ABCDEF
   0000000000000000
   0000000000000000
34 0123456789ABCDEF
   0000000000000000
   0000000000000000
35 0123456789ABCDEF
   0000000000000000
   0000000000000000
36 0123456789ABCDEF
   0000000000000000
   0000000000000000
37 0123456789ABCDEF
   0000000000000000
   0000000000000000
38 0123456789ABCDEF
   0000000000000000
   0000000000000000
```

FIG 9a

| FIG 9a |
|---|
| FIG 9b |

FIG 9

```
09 0123456789ABCDEF
   0000000000000000
   0000000000000000
0A 0123456789ABCDEF
   0000000000000000
   0000000000000000
0B 0123456789ABCDEF
   0000000000000000
   0000000000000000
0C 0123456789ABCDEF
   0000000000000000
   0000000000000000
0D 0123456789ABCDEF
   0000000000000000
   0000000000000000
0E 0123456789ABCDEF
   0000000000000000
   0000000000000000
0F 0123456789ABCDEF
   0000000000000000
   0000000000000000
```

```
19 0123456789ABCDEF
   0000000000000000
   0000000000000000
1A 0123456789ABCDEF
   0000000000000000
   0000000000000000
1B 0123456789ABCDEF
   0000000000000000
   0000000000000000
1C 0123456789ABCDEF
   0000000000000000
   0000000000000000
1D 0123456789ABCDEF
   0000000000000000
   0000000000000000
1E 0123456789ABCDEF
   0000000000000000
   0000000000000000
1F 0123456789ABCDEF
   0000000000000000
   0000000000000000
```

```
29 0123456789ABCDEF
   0000000000000000
   0000000000000000
2A 0123456789ABCDEF
   0000000000000000
   0000000000000000
2B 0123456789ABCDEF
   0000000000000000
   0000000000000000
2C 0123456789ABCDEF
   0000000000000000
   0000000000000000
2D 0123456789ABCDEF
   0000000000000000
   0000000000000000
2E 0123456789ABCDEF
   0000000000000000
   0000000000000000
2F 0123456789ABCDEF
   0000000000000000
   0000000000000000
```

```
39 0123456789ABCDEF
   0000000000000000
   0000000000000000
3A 0123456789ABCDEF
   0005704505747757
   000BE28B20582A44
3B 0123456789ABCDEF
   7777777777767704
   4444444444442108
3C 0123456789ABCDEF
   0000000000000000
   0000000000000000
3D 0123456789ABCDEF
   3BF0000000000000
   0000000000000000
3E 0123456789ABCDEF
   0000000000000000
   0000000000000000
3F 0123456789ABCDEF
   0000000000000000
   0000000000000000
```

FIG 9b

PROGRAMMABLE CALCULATORS HAVING DISPLAY MEANS AND MULTIPLE MEMORIES

This invention relates to calculating apparatus, and more particularly to compact (desk top) programmable and keyboard responsive calculating apparatus.

Keyboard responsive calculators have the ability to perform many of the complex mathematical manipulations of which large general purpose computers are capable. Recently, such calculators have been provided with means for storing a sequence of commands selected by the operator, and for executing this sequence, or program, on command. It is an object of this invention to provide a novel and improved keyboard responsive electric calculator that is easy to operate, that can be programmed using the keyboard, and that permits the user to perform a wide variety of data manipulations in a versatile manner.

Further, since it may be desirable to execute a particular portion (subroutine) of a stored program many times during the execution of the entire program, while at another time it may be desirable to execute that particular portion of the stored program independently of execution of the entire program, the capability of storing such subroutines and accessing such a subroutine in response to a single address-independent command originating either at the keyboard or within another stored program is a very useful feature of a calculator. Additionally, since different users of a calculator, or a single user at different times, may need a different selection of such subroutines, some of them suited to very specific computational tasks, it is desirable for the user of a calculator to be able to simply and easily replace one or more subroutines with others without necessarily replacing all the stored subroutines. It is also desirable for a calculator to be simply and easily provided by the user with individually designed subroutines not provided by the manufacturer of the calculator.

In addition, in certain uses of a calculator it may be desirable to work with greater accuracy than that provided by the usual display of the result in a single register. The capability of storing and displaying, in response to a single command, an additional portion of the result containing as many digits as the initial display, making possible double-precision arithmetic, is therefore a desirable feature of a calculator.

It is therefore a further object of the invention to provide a compact programmable keyboard responsive calculator that can store subprograms and can address such a subprogram in response to a single address-independent command. It is a further object of the invention to provide such a calculator with the capability of accessing such a subroutine in response to a command originating either from the keyboard or from a stored program, and the further capability of retaining information representative of such origin for controlling the further operation of the calculator after completion of a subroutine.

Another object of this invention is to provide a keyboard responsive calculator that can provide additional accuracy of results as desired, by generating and storing a result that exceeds the normal display capacity of the calculator for display in response to a single command by the operator, together with the normally displayed result portion.

Additionally, it is an object to provide these features in a calculator that is easy to use, compact, of simple design and of relatively low cost.

In accordance with the invention there is provided a programmable desk type calculator comprising a keyboard having a plurality of manually operable key elements for entering numerical values, a plurality of manually operable key elements for entering instructional values, computation means having a plurality of registers for storing numerical values and an arithmetic unit for operating on the numerical values in accordance with the instructional values and producing a result, display means having a predetermined number of display positions for displaying the result of an operation by the computation means, a first memory having first register means for storing the value displayed by the display means, second register means for storing a series of instructional values, and third register means for storing second register means address information, and a second memory for storing a plurality of predetermined control words. Each control word includes a plurality of computation means control fields and a further field for determining the next control word to be processed, and the computation means is responsive to the fields of said control words for controlling its operation. A series of control words are selected in response to an instructional value and cause the computation means to perform the operation specified by the instructional value.

In a particular embodiment the calculator includes status indicator means for preventing response of the computation means to an instructional value specified by one of the key elements, means responsive to actuation of one of the instructional value key elements for selecting a first control word in the second memory and for setting the status indicator means and means responsive to a field of one of the control words for clearing the status indicator means and enabling the computation means to respond to another instructional value entered by one of the manual key elements. The first memory further includes means for storing a predetermined number of digits of a result produced by the computation means greater than the number of said display positions, and the keyboard includes a manually operable key element for selectively displaying the stored digits of said result in excess of the predetermined number of display positions.

Also in a particular embodiment, each control word includes a first field for determining the source of one input to the arithmetic unit, a second field for determining the source of a second input to the arithmetic unit, a third field for determining the destination of data transferred from the arithmetic unit, and a fourth field for specifying the mode of operation of the arithmetic unit, and a fifth field for controlling transfer of data to and from said first memory; a plurality of reference storage means, including status register means, for storing a plurality of current status reference quantities; and address setting means responsive to the said further field in said control words and to a current status reference quantity stored in the reference storage means for determination of the next control word. Further, the stored sequence of instructional values in the calculator may include subroutine indicators (initial sequence designating values,) the keyboard includes a manually operable subroutine key element for entering a subroutine value, corresponding to a stored subroutine indicator, and means responsive to the keyboard entered subroutine value for finding in the first memory the corresponding subroutine indicator and for initiating operation of the calculator according to the stored subroutine corresponding to the designated subroutine indicator. The first memory also includes means for storing an operating status reference quantity that has a first value representing operation of the calculator in response to a subroutine value entered through said keyboard, and a second value representing operation in response to a subroutine value stored in the first memory.

The status register is set in response to the control words and to the stored operating status reference quantity and provides a particular current status for determining successive control words to be executed by the calculator. A value representing the location within the first memory of the instructional value currently accessible for controlling the operation of the calculator is also stored in the first memory and in response to a subroutine value and the operating status reference quantity the stored current instruction location value is modified. Upon completion of the specified subroutine, the modified value is used to select successive control words for subsequent operation of said calculator.

A preferred embodiment of the invention is a self-contained desk top electronic calculator constructed with integrated circuits on snap-in replaceable printed circuit modules. It contains six system elements, a keyboard, a dual register display, an arithmetic unit, a magnetic core memory, a read only memory, and a casette tape transport. The core memory contains X and Y registers used for arithmetic operations and data transfers, a plurality of additional data registers and a capacity for storing several hundred program steps. Each register has a capacity for storing twelve decimal digits with sign and a two digit exponent with sign. The display exhibits the contents of both X and Y registers. Information in the core memory may be recorded on tape for later use and conversely the information on tape can be loaded into core memory.

The keys on the keyboard enter numbers into the X register and initiate a variety of arithmetic functions, transfer functions and mathematical manipulations, each with a single keystroke. Further, sixteen special function keys are provided to address specific stored programs. The stored programs which are called out by these keys can be changed directly from magnetic tape casettes. Typical series of such programs include programs designed to provide trigonometric functions such as sine, cosine, tangent, and conversion of angle values from degrees to radians; statistical programs; bond analysis programs; surveying program, etc. Further extended precision arithmetic can be performed through the use of the recall residue key, the calculator in response to that key providing a display of an additional twelve digits of accuracy. The invention provides an easy to operate powerful and versatile electronic calculator which can be programmed using the keyboard, and operates in response to single keystroke commands.

Other objects, features and advantages of the invention will be seen as the following description of a particular embodiment progresses, in conjunction with the drawings in which.

FIGS. 7*a* and 7*b* shows selected portions of the permanent control storage contents;

FIGS. 8*a*, 8*b* and 8*c* shows the contents of selected work and memory registers of the calculator during execution of the instructions represented by the control storage portions shown in FIG. 7; and FIGS. 9*a* and 9*b* shows the entire contents of the calculator memory after a particular program of commands has been stored therein.

Figure 1:
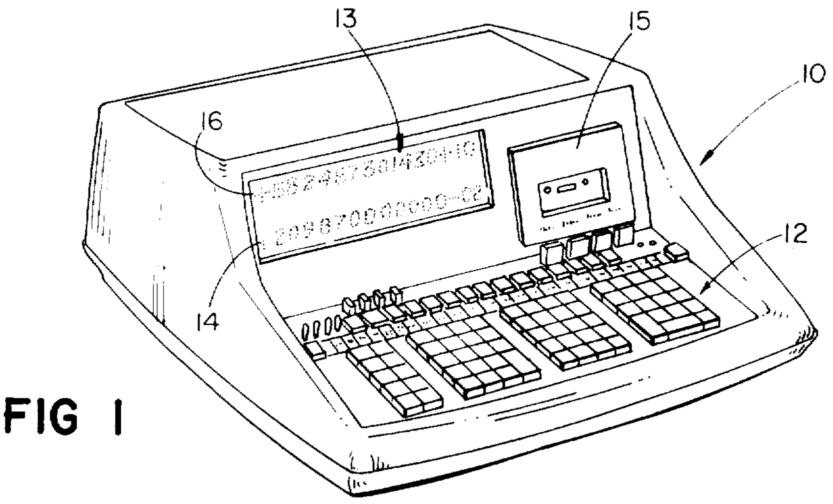
FIG. 1 is a perspective view of the exterior of the calculator of the invention.
Figure 2:
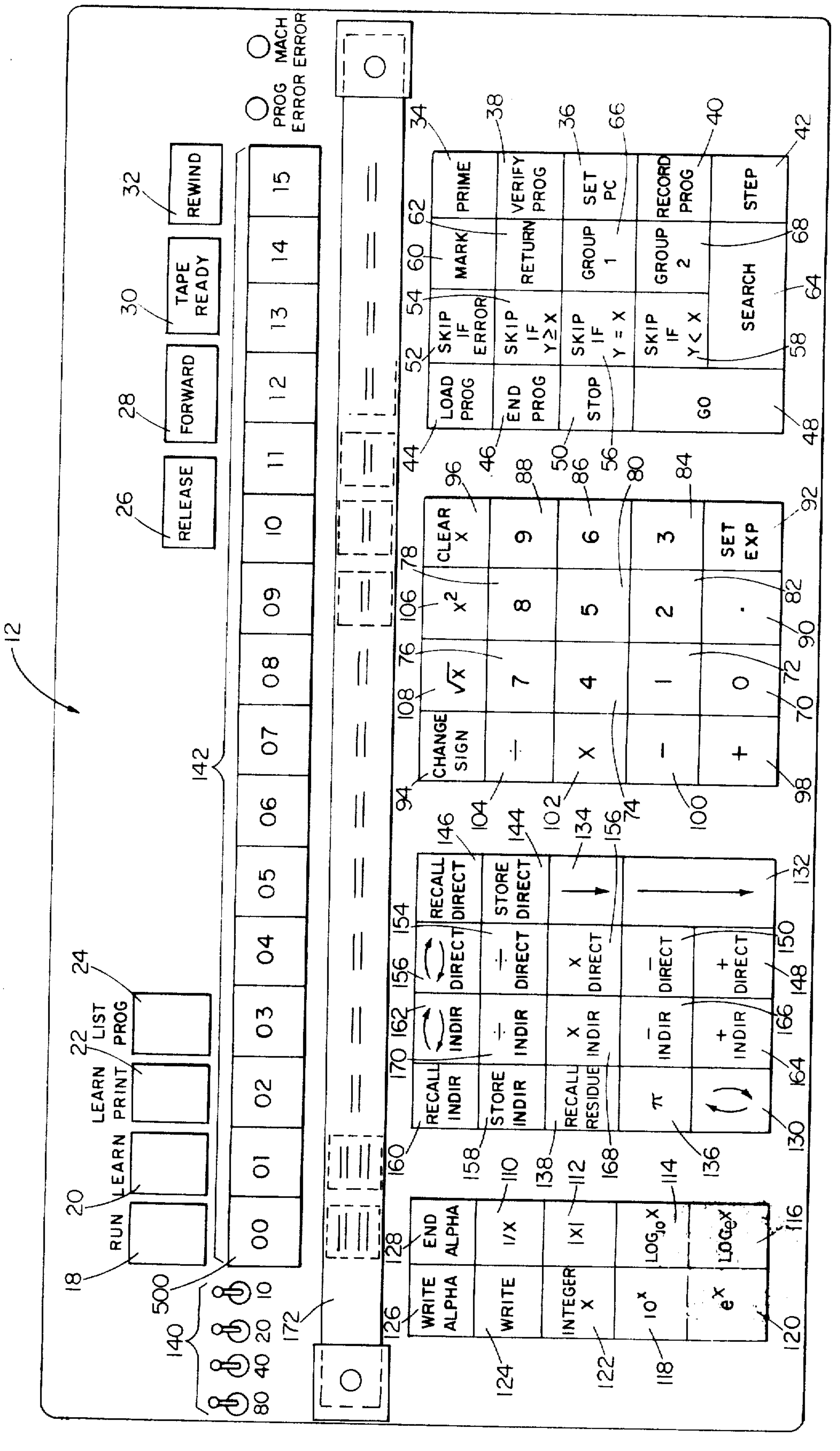
FIG. 2 shows the calculator keyboard.

Referring to FIGS. 1 and 2, the programmable desk calculator 10 of the invention provides a keyboard 12, a two-register display 13 and a tape drive unit 15. The keys of keyboard 12 are used to enter information and instructions into the calculator. The calculator display 13 consists of an X work register display 14 and a Y work register display 16. Both the X and Y Registers are displayed simultaneously by half-inch nixie-type tubes. Each register has a ± sign and 12 digit mantissa followed by a two-digit exponent with a range of −99 to +99, of the form:

± · X X X X X X X X X X X X ± X X (Y-Register)
± · X X X X X X X X X X X X ± X X (Y-Register)
mantissa — exponent
floating decimal
sign of mantissa — sign of exponent Calculator 10 has four different modes of operation. Keyboard 12 includes a group of 4 mode switches 18, 20, 22 and 24; switch 20 places the calculator in LEARN mode, in which a program is loaded into the calculator's core memory; this may be done directly by depressing a series of operation keys in turn, or indirectly from a tape. Switch 18 places the calculator in RUN mode, in which an operation or series of operations is actually carried out. Switches 22 and 24 are used only in connection with an optional output printing device not shown in this embodiment.

If a tape is to be used, a group of 4 tape control keys 26, 28, 30 and 32 control the tape drive mechanism 15.

The RELEASE button 26 allows the operator to remove or insert his tape casette (not shown). The Forward button 28 moves the tape in a forward direction. The Tape-ready button 30 places the head of the tape reader in contact with the tape and conditions the calculator for an instruction transfer operation.

The Rewind button 32 rewinds the tape.

In the lower half of keyboard 12 are four groups of operation keys. On the far right are five keys which, because of their functions, cannot be programmed on the calculator. These include the PRIME key 34 which is used to initialize the calculator, by clearing the x and y register displays 14 and 16, resetting a program counter and resetting certain error-indicators. The operation of PRIME key 34 will be explained more fully below as part of a detailed explanation of the operation of the calculator.

The SET PC key 36 allows the user of the calculator to address and set a Program Counter which indicates which program step, from 000 to 959, is to be executed next. The Verify Program key 38 decimally adds the high-order and low-order digits of program codes stored in the calculator memory and displays the sum in X register display 14 for checking by the user. The Record Program key 40 is used to transfer a program from the calculator memory to magnetic tape. The STEP key 42 allows the user to step through a program one step at a time.

Grouped with these five non-programmable keys are keys representing certain programming controls. These include the LOAD PROGram key 44, used to transfer a program block to memory; END PROGram key 46, which signals the end of a program block; the GO key 48, used to continue the program at the next step after a STOP instruction; STOP key 50, which signals the end of a program; four SKIP keys 52, 54, 56 and 58, used to accomplish decision-making within the program; MARK key 60, which generates a code used together with a name code to mark the start of a program in memory; RETURN key 62, used in branching within a program; and the SEARCH key 64, which initiates a search for a particular combination of the MARK instruction with a name. The GROUP 1 and GROUP 2 keys 66, 68 are used for addressing optional peripheral equipment.

The group of keys to the left of the group just described include ten number entry keys 70, 72, 74, 76, 78, 80, 82, 84, 86, and 88, and a decimal point key 90, used for entering a number into the X register display 14. The SET EXP key 92 enables the exponent value of X to be set with the next two successive keystrokes. SET EXP key 92 automatically aligns the decimal point in the left-most position of X register display 14. The CH SIGN key 94 changes the algebraic sign of the mantissa or exponent of X. The CLEAR X key 96 clears the X register display 14.

Arithmetic operation keys are provided for addition (key 98), subtraction (key 100), multiplication (key 102), and division (key 104). The number in the x display will be squared by depressing key 106, or its square root will be taken by depressing key 108. Further arithmetic operation keys provide the values of $1/x$ (key 110), absolute value of x (key 112), $\log_{10} x$ (key 114), $\log_e x$ (key 116), $10^x$ (key 118), and $e^x$ (key 120). Depression of key 122 replaces the number in the x display with the integer part of the number only.

Three keys (124, 126, and 128) are used in programming to control the output of a printer or other output device.

Key 130 causes the values displayed in the $x$ and $y$ registers to be interchanged. Key 132 moves the value of $x$ into the $y$ display, leaving the $x$ display unchanged. Key 134 moves the value of $y$ into the $x$ display, leaving the $y$ display unchanged. Key 136 sets the value of $\pi$ into the $x$ display. Key 138, Recall Residue, is used in performing double precison arithmetic, in a manner to be explained more fully in what follows.

The remaining keys are used together with the four toggle switches 140 and the row of special function keys 142 in performing arithmetic operations with numbers stored in the memory of the calculator. A register in which a number may be stored is identified by a combination of toggle switch settings and indexing of special function keys. The Store Direct key 144, followed by the register number, is used to store a number in the identified register. Depression of Recall Direct key 146, together with a register number, recalls a number from the designated register into $x$-register display 14. The Add Direct (148), subtract direct (150), multiply direct (152), and divide direct (154) keys are used to perform the designated operation upon the number in $x$-register 14 and the number in the designated storage register. The result is stored in the same storage register and the contents of $x$-register 14 and $y$-register 16 remain unchanged. The Exchange Direct key 156 is used to exchange the number in $x$-register 14 with the number in the designated storage register.

The remaining keys are used for indirect addressing; in this mode, $y$-register 16 displays the address in the register being addressed; the command is performed on the number in $x$-register 14 and the result is placed in the designated storage register. The Store Indirect key 158 stores the number in $x$-register display 14 into the memory register designated by the number in $y$-register display 16. The Recall Indirect key 160 recalls a number to $x$-register display 14 from the register designated in $y$-register display 16; the number also remains in the storage register (non-destructive recall). Exchange Indirect key 162 exchanges the number in $x$-register display 14 with the number in the memory register designated by $y$-register display 16. The Add Indirect key 164 adds the number in $x$-register display 14 to the number in the designated register, and stores the sum in the same register; the number in $x$-register display 14 remains unchanged. The Subtract Indirect (166), Multiply Indirect (168) and Divide Indirect (170) keys similarly perform the designated operation upon the number in $x$-register display 14 and the number stored in the designated register.

Each programmable operation of the calculator is represented by a numerical code. Since the internal operation of the calculator is carried out in the binary number system, the basic unit of information within the machine is a bit, which may be either zero or one. Eight bits make a byte, divided for convenience into two half bytes of four bits each:

0000 0000 .

The value of each half-byte can range from 0 to 15 in decimal notation. For convenience these decimal numbers may be represented in hexidecimal notation, that is, with a base of 16 instead of 10; to do this, the letters A through F are used to represent the numbers 10 through 15. We thus have the table of equivalents (Table 1):

TABLE 1

| binary | decimal | hexidecimal |
|---|---|---|
| 0000 | 0 | 0 |
| 0001 | 1 | 1 |
| 0010 | 2 | 2 |
| 0011 | 3 | 3 |
| 0100 | 4 | 4 |
| 0101 | 5 | 5 |
| 0110 | 6 | 6 |
| 0111 | 7 | 7 |
| 1000 | 8 | 8 |
| 1001 | 9 | 9 |
| 1010 | 10 | A |
| 1011 | 11 | B |
| 1100 | 12 | C |
| 1101 | 13 | D |
| 1110 | 14 | E |
| 1111 | 15 | F |

The numerical codes for the operations of the calculator may therefore be represented either as two two-digit decimal numbers or as one two-digit hexidecimal number. Both values are given in Table 2.

TABLE 2

| code hexidecimal | decimal | key |
|---|---|---|
| 40 | 0400 | + DIRECT |
| 41 | 0401 | − DIRECT |
| 42 | 0402 | × DIRECT |
| 43 | 0403 | ÷ DIRECT |
| 44 | 0404 | STORE DIRECT |
| 45 | 0405 | RECALL DIRECT |
| 46 | 0406 | ⇄ DIRECT |
| 47 | 0407 | SEARCH |
| 48 | 0408 | MARK |
| 49 | 0409 | GROUP 1 |
| 4A | 0410 | GROUP 2 |
| 4B | 0411 | WRITE |
| 4C | 0412 | WRITE ALPHA |
| 4D | 0413 | END ALPHA |
| 4E | 0414 | STORE Y |
| 4F | 0415 | RECALL Y |
| 50 | 0500 | + INDIR |
| 51 | 0501 | − INDIR |
| 52 | 0502 | × INDIR |
| 53 | 0503 | ÷ INDIR |
| 54 | 0504 | STORE INDIR |
| 55 | 0505 | RECALL INDIR |
| 56 | 0506 | ⇄INDIR |
| 57 | 0507 | SKIP if Y ≥ X |
| 58 | 0508 | SKIP if Y<X |
| 59 | 0509 | SKIP if Y=X |
| 5A | 0510 | SKIP if ERROR |
| 5B | 0511 | RETURN |
| 5C | 0512 | END PROG |
| 5D | 0513 | LOAD PROG |
| 5E | 0514 | GO |
| 5F | 0515 | STOP |
| 60 | 0600 | + |
| 61 | 0601 | − |
| 62 | 0602 | × |
| 63 | 0603 | ÷ |
| 64 | 0604 | ↑ |
| 65 | 0605 | ↓ |
| 66 | 0606 | ↑↓ |
| 67 | 0607 | \|X\| |
| 68 | 0608 | INTEGER X |
| 69 | 0609 | $\pi$ |
| 6A | 0610 | $Log_{10}X$ |
| 6B | 0611 | $Log_eX$ |
| 6C | 0612 | $\sqrt{X}$ |
| 6D | 0613 | $10^x$ |
| 6E | 0614 | $e^x$ |
| 6F | 0615 | $1/x$ |
| 70 | 0700 | 0 |
| 71 | 0701 | 1 |
| 72 | 0702 | 2 |
| 73 | 0703 | 3 |
| 74 | 0704 | 4 |
| 75 | 0705 | 5 |
| 76 | 0706 | 6 |
| 77 | 0707 | 7 |
| 78 | 0708 | 8 |
| 79 | 0709 | 9 |
| 7A | 0710 | SET EXP |
| 7B | 0711 | CHANGE SIGN |
| 7C | 0712 | DECIMAL POINT |
| 7D | 0713 | $X^2$ |
| 7E | 0714 | RECALL RESIDUE |
| 7F | 0715 | CLEAR X |

The code representing each command is generated by depressing the appropriate operation key on keyboard 12. Alternatively, any code may be also generated by setting the toggle switches 140 and indexing one of the special function keys 142. The special function key is used to define the low-order (hexidecimal) digit and the combination of toggle switches is used to define the high-order digit. The special function keys are also used to address storage in the direct and indirect operations, as previously described.

In addition, the special function keys 142 are used to address a variety of subroutines. A set of 64 operation codes is reserved for this purpose. A complete list of these reserved codes (in decimal form) is given in Table 3.

TABLE 3

| | | | |
|---|---|---|---|
| 0000 | 0100 | 0200 | 0300 |
| 0001 | 0101 | 0201 | 0301 |
| 0002 | 0102 | 0202 | 0302 |
| 0003 | 0103 | 0203 | 0303 |
| 0004 | 0104 | 0204 | 0304 |
| 0005 | 0105 | 0205 | 0305 |
| 0006 | 0106 | 0206 | 0306 |
| 0007 | 0107 | 0207 | 0307 |
| 0008 | 0108 | 0208 | 0308 |
| 0009 | 0109 | 0209 | 0309 |
| 0010 | 0110 | 0210 | 0310 |
| 0011 | 0111 | 0211 | 0311 |
| 0012 | 0112 | 0212 | 0312 |
| 0013 | 0113 | 0213 | 0313 |
| 0014 | 0114 | 0214 | 0314 |
| 0015 | 0115 | 0215 | 0315 |

When a number of subroutines are stored in the memory of the calculator, each subroutine being addressable by use of a special function key 142, a label strip 172 may be removably secured to calculator keyboard 12, providing designation of the stored subroutines. Such subroutines may be provided as a group and read into memory from a tape cassette, or may be individually stored into memory by the user of the calculator. The subroutines may be accessed either from the keyboard by depression of the appropriate special function key 142, or from a stored program by use of the appropriate numerical code, as will be more fully explained in what follows.

Figure 3:
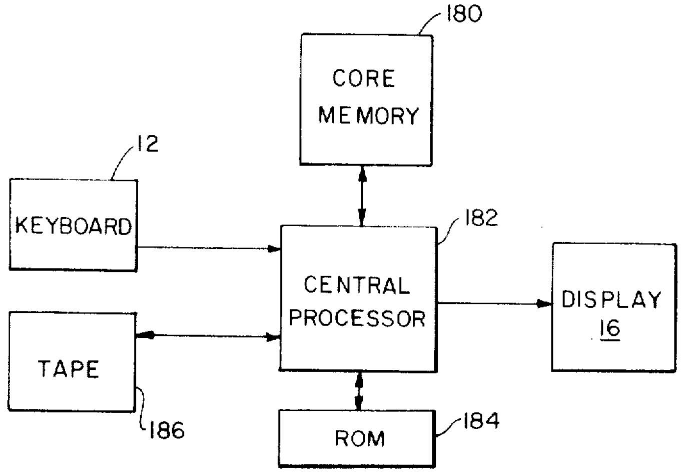
FIG. 3 is a schematic block diagram of the internal structure of the calculator.

The internal structure of the calculator comprises (FIG. 3) a core memory 180, a central processing unit 182, and a read-only memory 184; input may be from keyboard 12 or from a tape 186, and output may be to devices such as a display, a typewriter or a plotter, for example.

Read-only memory 184, whose construction is described in U.S. Pat. Application Ser. No. 74,369, filed Sept. 22, 1970, and assigned to the same assignee as this application, contains 2048 prewired instructions in the form of control words, controlling the operations of central processor 182 and other parts of calculator 10. The calculator has the capacity to access these stored instructions non-sequentially in response to commands entered through keyboard 12 or tape 186, permitting varied and complex operations, involving decisions determining the sequence of instructions, to be performed automatically. Each control word contains 43 bits and is divided into 13 fields. Fields within a word, to be more fully described in what follows, direct the various internal operations of the calculator to permit the carrying out of the command. A command is entered as a two-digit code, as previously described, which is decoded within the calculator and causes branching to the addresses of a sequence of appropriate control words within the read only memory, in a manner to be described.

Figure 4:
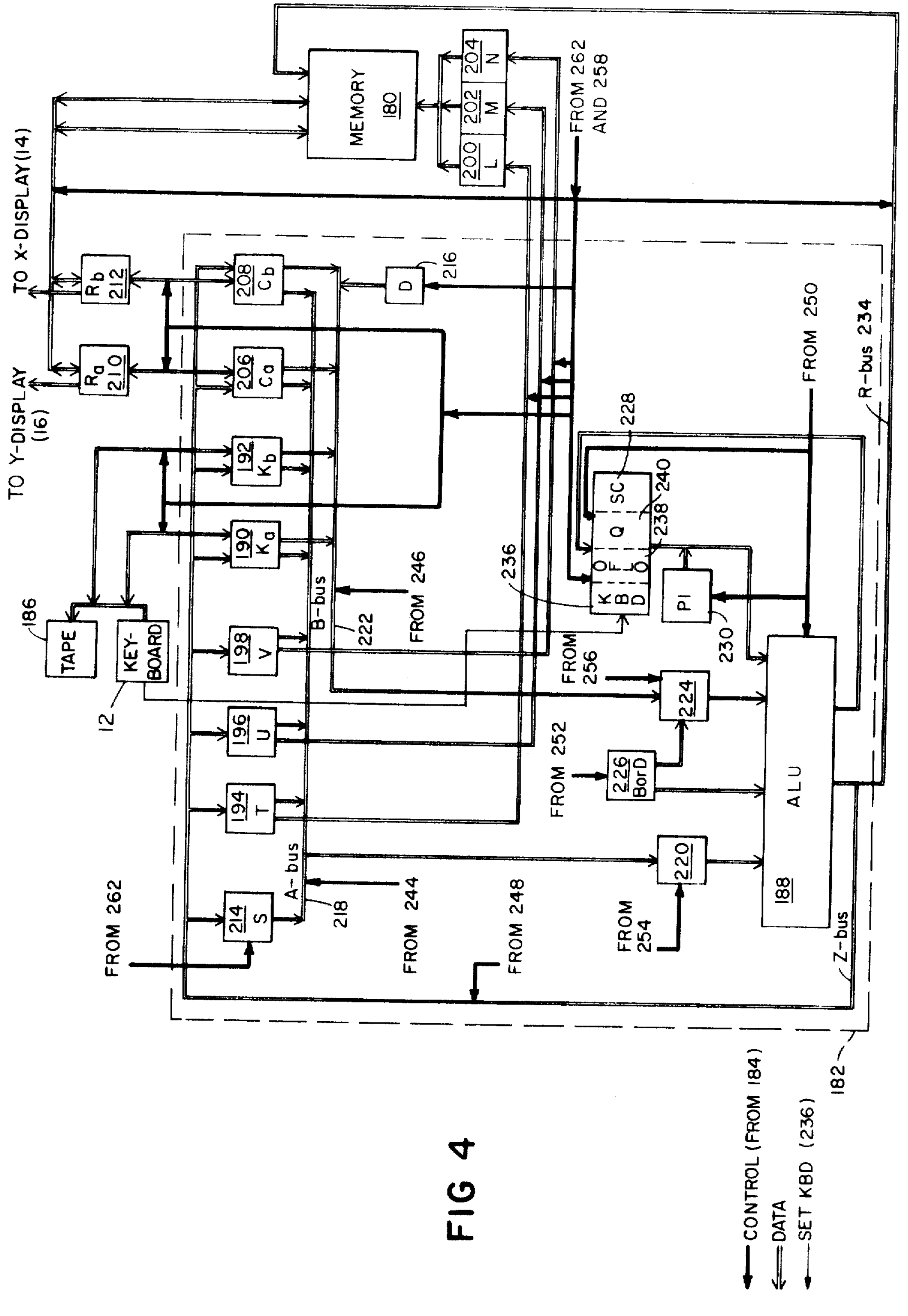
FIG. 4 is a schematic block diagram, in greater detail, of a portion of FIG. 3.

Central processing unit 182, which includes an arithmetic logic unit 188 and several registers, is shown in FIG. 4. All registers are four bits wide, except as described hereafter, as are all transfer lines.

Input and output between keyboard 12 (or other external devices) and central processor 182 are through the external communication registers Ka (190) and Kb (192). The T, U, and V registers (194, 196, and 198) are address arithmetic registers. The L, M, and N registers (200,202, and 204) are memory access address registers; M and N are 4-bit registers, while L is a 2-bit register in this embodiment, although it may contain 3 or 4 bits in other embodiments. L, M, and N may be set by the parallel transfer of the contents of T, U, and V or by transfer of V to N and constant values to M and L, as will be described. All memory access selection in the present embodiment of the calculator is performed by using the 10 bit contents of L, M, and N to select a byte in memory 180.

Registers $C_a$ and $C_b$ (206, 208) are memory communication registers. Data can be sent to these registers from the address in core memory 180 specified by the contents of LMN registers 200, 202 and 204, or data can be sent from registers 206 and 208 to that address. Registers $R_a$ and $R_b$ (210,212) are memory access registers (buffer registers). The contents of $R_a$ and $R_b$ are displayed to the user of the calculator when the calculator is in Run mode.

S register 214 is an internal status register, containing four status bits in the arrangement S3, S2, S1, S0. These may be set in response to the status field (stat) in the current control word, or may be set with the output of ALU 188.

Register D (216) is an external status register. It is set by depression of one of mode buttons 18, 20, 22, and 24 and indicates internally what mode has been selected by the user.

The contents of registers S (214), TUV (194, 196, and 198), $K_a$ and $K_b$ (190 and 192), and $C_a$ and $C_b$ (206 and 208), can be transferred via the A-bus 218 to arithmetic logic unit 188 (ALU) through pass-through inhibit switch 220, under the control of a control word in Read-only memory 184, as will be described.

The contents of registers D (216), $C_a$ and $C_b$ (206 and 208), $K_a$ and $K_b$ (190 and 192), or a constant value specified by the current control word in a manner to be described, can be sent via the B-bus (222) to ALU 180 through switch 224. Pass-through/inhibit/complement selection switch 224 controls the transfer of the data on B-bus 222 or its complement to ALU 188.

Binary or decimal adder selector (B or D) (226) determines whether ALU 188 will operate in binary or decimal mode; B or D 226 also controls the type of complementation in switch 224. Other inputs to ALU 188 are the saved carry value (SC) (228) and a plus one source (P1) (230).

Output from ALU 188 via the Z-bus 232 may be to the S (214), TUV (194, 196, 198), Ka and Kb (190 and 192), or Ca and Cb (206 and 208) registers. Output to memory 180 is via the R-bus 234.

The KBD, OFLO, and Q bits (236, 238 and 240) are status bits. KBD bit 236 is set on directly when the operator operates the keyboard of the calculator and is set off by a field (stat=1001) in the control word. While KBD bit 236 is on, further keyboard input will be disregarded by the calculator. OFLO bit 238 is set on by a control word field (stat=1100) and off by ALU 188. The Q bit is set in response to the memory operation field in the control word. The values of the OFLO and Q bits may (rarely) be used in determining the address of the next control word to be accessed. Further details of the types of logic incororated in portions of this calculator may be had with reference to U.S. Pat. No. 3,509,329, issued Apr. 28, 1970, to An Wang et al.

Figure 5:
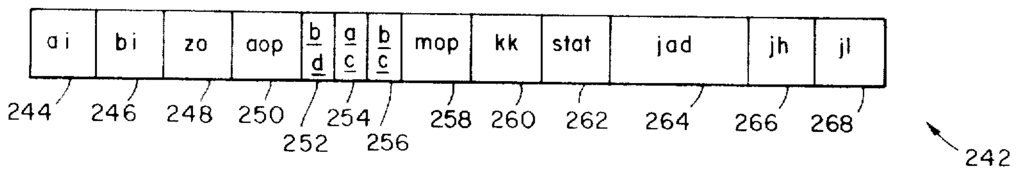
FIG. 5 shows the format of a portion of the permanent control storage of the calculator.

The operations of central processor 182 and memory 180 are controlled by the 2048 control words wired in the read-only memory 184. The control word format 242 is shown in FIG. 5.

The 3-bit *ai* (A input) field 244 determines the source of input to A-bus 218. The *ai* field values and the resulting sources for the A-bus may be any of the following:

| binary value | decimal value | source | |
|---|---|---|---|
| 000 | 0 | S register | (214) |
| 001 | 1 | T register | (194) |
| 010 | 2 | U register | (196) |
| 011 | 3 | V register | (198) |
| 100 | 4 | Ka register | (190) |
| 101 | 5 | Kb register | (192) |
| 110 | 6 | Ca register | (206) |
| 111 | 7 | Cb register | (208) |

The 3-bit bi (B input) field 246 determines the source of input to B-bus 222. The bi field values and resulting sources may be any of the following:

| binary value | decimal value | source | |
|---|---|---|---|
| 000 | 0 | (unused) | |
| 001 | 1 | constant field in control word | |
| 010 | 2 | D register | (216) |
| 011 | 3 | (unused) | |
| 100 | 4 | Ka register | (190) |
| 101 | 5 | Kb register | (192) |
| 110 | 6 | Ca register | (206) |
| 111 | 7 | Cb register | (208) |

The 3-bit zo (Z output) field 248 determines the destination of data transmitted from ALU 188 on *z*-bus 232, and has the same values and corresponding registers as *ai* field 244.

The 3-bit *aop* field 250 determines ALU operations; it has the following possible values and corresponding operations:

| mnemonic | binary value | hexi-decimal value | operation |
|---|---|---|---|
| *a* | 000 | 0 | Add A-bus (218) and B-bus (222) inputs |
| *ia* | 001 | 1 | Add the A-bus and B-bus inputs and the Plus One generator output (230) |
| *ac* | 010 | 2 | Add the A and B bus inputs and save the resulting carry (if any) in SC (228) |
| *cac* | 011 | 3 | Add the A and B bus inputs and the contents of SC (the previous saved carry); save resulting carry in SC |
| *iac* | 100 | 4 | Add the A and B bus inputs and the plus one generator output; save resulting carry in SC |
| *and* | 101 | 5 | Logical AND of the A and B bus inputs |
| *xor* | 110 | 6 | Logical exclusive OR of the A and B bus inputs |
| *half* | 111 | 7 | 110 following by shift right one bit. Contents of SC fills from the left; the lost bit is sent to SC, and current carry (halve circuit; shift right). |

The one-bit bd field 252 controls BorD selector 226. A value of 0 in this field directs ALU 188 and complementer 224 to operate in the binary mode; a value of 1 directs them to operate in the decimal mode.

The one-bit ac field 254 controls input on A bus 218 to ALU 188; a value of 0 inhibits input on this line; a value of 1 permits input.

The two-bit *bc* field 256 controls the complement function and input on B bus 222 to ALU 188 and has the following possible values and corresponding operations:

| decimal | binary | operation |
|---|---|---|
| 0 | 00 | inhibit all input from B bus to ALU |
| 1 | 01 | pass all input on B bus to ALU |
| 2 | 10 | set O's in B bus and send |

| | | |
|---|---|---|
| 3 | 11 | complement to ALU complement contents of B and send to ALU |

The four-bit mop field 258 controls memory access by controlling the loading of the LMN address selection registers 200, 202, and 204, controls reading from and writing into memory 180, and controls transfer of data to and from external devices. This field may have the following values and corresponding operations:

| mnemonic | binary value | hexi-decimal value | operation |
|---|---|---|---|
| *wra* | 0000 | 0 | Transfer the ALU output on the R-bus to register $R_a$; then logical exclusive OR the contents of registers $R_a$ and $R_b$ with the byte of storage whose address is currently pointed to by LMN |
| *wrb* | 0001 | 1 | Same as 0000, except that R-bus transfer is to register $R_b$ |
| *rdt* | 0010 | 2 | Memory readout: Transfer the contents of TUV to LMN; then transfer the contents of the byte of storage pointed to by LMN to registers $R_a$ and $R_b$; at end of operation, transfer the contents of registers $R_a$ and $R_b$ to registers $C_a$ and $C_b$, respectively. Storage readout is destructive. When *rdt* is followed by *wra* or *wrb*, storage is rewritten (restored or altered) |
| *clt* | 0011 | 3 | Same as 0010, except that nothing goes to registers $C_a$ and $C_b$; registers $R_a$ and $R_b$ are refilled. This has the effect of clearing a byte of storage after loading LMN from TUV |
| *rdv* | 0100 | 4 | Transfer four binary ones to register L; transfer the contents of the CS constant field (kk) to register M; transfer the contents of register V to register N; then transfer the contents of the byte of storage pointed to by LMN to registers $R_a$ and $R_b$; finally, transfer the contents of $R_a$ and $R_b$ to $C_a$ and $C_b$, respectively. Readout is destructive. When followed by *wra* or *wrb*, storage is restored or altered |
| *clv* | 0101 | 5 | Same as 0100, except that nothing goes to registers $C_a$ and $C_b$; registers $R_a$ and $R_b$ are refilled |
| *gin* | 0110 | 6 | General input: accept a byte from an external device into registers $K_a$ and $K_b$ |
| *gout* | 0111 | 7 | General output: deliver to an external device the contents of registers $K_a$ and $K_b$ |
| *null* | 1000 | 8 | No memory access operation |
| *setq* | 1001 | 9 | Transfer the carry of the current ALU operation to the Q bit (or SC to Q) |
| *tin* | 1010 | A | Tape input: accept the next bit from the tape cassette. Calculator will interlock until transmission is complete. Bit appears in low bit of register $K_b$. (Each two bits are separated by a timing bit.) |
| *tout* | 1011 | B | Tape output: deliver a bit value found in the low bit position of $K_b$ to the tape cassette for output. In addition to data bit values, timing bits between data bits will be delivered by this function |
| | 1100 | C | Does nothing at microcode |
| | 1101 | D | level, turns tape motor on/off |

The prewired four-bit constant *kk* field 260 may have any four-bit configuration.

The four-bit stat field 262 determines the setting of six status bits, four in Status register 214 together with the KBD and OFLO bits 236 and 238. The possible values of this field together with the resulting operations are:

| mnemonic | binary value | hexi-decimal value | operation |
|---|---|---|---|
| | 0000 | 0 | Do not set status bits |
| S0 | 0001 | 1 | |
| S1 | 0010 | 2 | Set the appropriate bit of |
| S2 | 0011 | 3 | register S on unconditionally |
| S3 | 0100 | 4 | |
| Z0 | 0101 | 5 | |
| Z1 | 0110 | 6 | Set the appropriate bit of |
| Z2 | 0111 | 7 | register S off unconditionally |
| Z3 | 1000 | 8 | |
| ZK | 1001 | 9 | Set the KBD bit off |
| SN | 1010 | A | Set S0 on if the ALU output is non-zero |
| SZ | 1011 | B | Set S1 on if the output of the ALU is zero |
| OVF | 1100 | C | Set the OFLO bit on |
| ZA | 1101 | D | Set all the bits of register S off unconditionally |
| | 1110 | E | Sets parity error bit |
| | 1111 | F | (unused) |

The last three fields, *jad*, *jh* and *jl* (264, 266, and 268) are used to determine the address of the next control word to be accessed in read-only memory 184. The nine-bit *jad* field 264 contains the high-order jump address, and the two 3-bit fields 266 and 268 are interpreted to provide the last two bits of the address.

Figure 6:
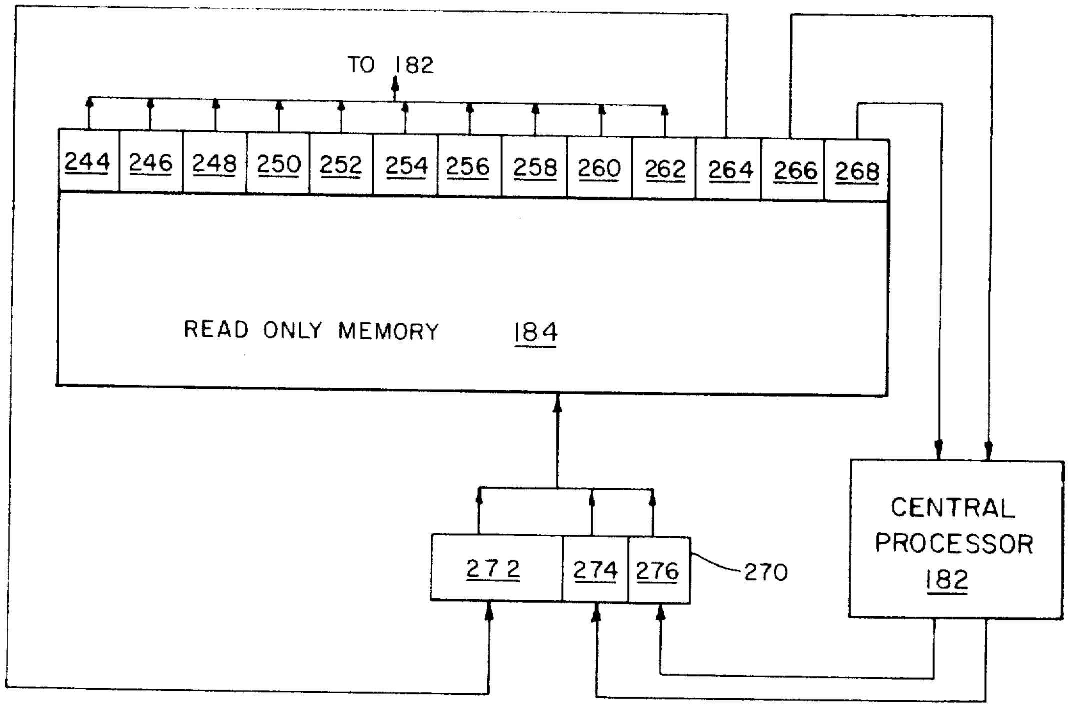
FIG. 6 is a schematic diagram of the access means for the control storage of the calculator.

FIG. 6 shows schematically the read-only memory 184 and its 11-bit Control Storage Address register 270, which contains three fields, *bad*, *bh*, and *bl* (272, 274, 276). The *jad* field 264 in the currently accessed word is loaded into the *bad* field 272 of storage address register 270, while the *jh* and *jl* fields must be evaluated to determine the inputs to *bh* (274) and *bl* (276).

The possible values of these address fields and the resulting values set into the *bh* and *bl* fields are:

| | | |
|---|---|---|
| jh: | 000 | set 0 into *bh* unconditionally |
| | 001 | set 1 into *bh* unconditionally |
| | 010 | set S register bit S1 into *bh* responsive to stat field |
| | 011 | set S register bit S3 into *bh* |
| | 100 | set OFLO bit value into *bh*, set OFLO off |
| | 101 | if the current ALU output had a carry, set *bh* to 1; otherwise set to 0 |
| | 110 | set contents of KBD bit into *bh* |
| | 111 | (unused) |
| jl: | 000 | set 0 into *bl* unconditionally |
| | 001 | set 1 into *bl* unconditionally |
| | 010 | set S register bit S0 into *bl* |
| | 011 | set S register bit S2 into *bl* |
| | 100 | if the ALU output is zero, set *bl* to 1; otherwise set it to 0 |
| | 101 | set contents of Q bit into *bl* |
| | 110 | set contents of SC bit into *bl* |
| | 111 | (unused) |

A single control word may specify several different functions to be performed by the hardware. Therefore an order must be specified in which these functions will be performed. The following sequence is followed:

1. Set the memory access address registers LMN (200, 202, 204) if required by MOP field 258.
2. Perform tape input or output, general input or output, read from memory or clear memory if specified by MOP field 258.
3. Select A-bus (218) and B-bus (222) sources and Z-bus (232) destination according to the AI, BI, and ZO fields respectively (244, 246, 248).
4. Select binary or decimal operation according to BD field 252.
5. Perform A and B input controls as specified by the AC and BC fields (254, 256).

6. Select the operation to be performed on the inputs as specified in AOP field 250, and pass the A and B inputs through to ALU 188.
7. Calculate the jump address from the JAD, JH, and JL fields (264, 266, 268).
8. Pass the output of ALU 188 along Z-bus 232 to its destination.
9. Save the carry if AOP field 250 requires it.
10. Set the status according to STAT field 262.
11. Perform SETQ, write into memory, gate RA/RB into CA/CB if specified by MOP field 258.
12. Fetch the next control storage word.

When the calculator is turned on, or when the PRIME key 34 is depressed, the calculator automatically accesses and executes a sequence of control words which clear *x* and *y* displays 14 and 16 and in other ways prepare the calculator for operation, as more fully to be described. The calculator then automatically branches to a DISPLAY cycle of operations, during which the *x* and *y* displays continue to show zeros; during this cycle, a sequence of executed control words causes the calculator continually to test the KBD bit 236 and the mode storage D register 216. When a key is depressed on keyboard 12, KBD bit 236 is automatically set to 1. When this is detected by the calculator, the KBD bit value, together with the settings of the D register 216 in response to the mode keys, are used to determine branching to the DECODE sequence of control words. Further operation of the calculator is determined by the accessing of appropriate control words in response to the particular command that has been input.

The functioning of the control words and the manner of decisional branching from one word to the next is best understood by following through a specific example in detail. In the description that follows, a hexidecimal number appearing without quotation marks, such as 3B3, refers by address to a particular register, whereas a number appearing in quotation marks, as "3AF", refers to the contents of a register, either in memory or in the central processor, whose address or name is in general a number different from the contents. "Control word" refers to the numerical contents of a format like that shown in FIG. 5. The name of each control word is generally a combination of letters and numerals, the letters referring to a particular routine in which the word appears (such SEARCH AND RETURN, represented as SAR), while the numbers (such as 523) refer to a sequential listing of statements including all control words, not given here. "Statement" refers to a line of print including, generally, the name and address of a control word, the word itself, and various comments representing in mnemonic form the operations specified by the numerical values of the control word fields. "Command" refers to operations and number entries that are represented by codes and may be initiated by depressing appropriate keys on keyboard 12; "instruction" refers to internal operations directed by control words as the calculator performs the command.

FIG. 7 shows the listing of a sequence of control words which cause execution of the operation PRIME, initiated by turning on the calculator or by depressing PRIME button 34 (FIG. 2). This operation is employed to initialize the calculator before use; the particular portion of the operation to be described here results in clearing the *x* and *y* display registers in memory 180.

The fields of each control word are numbered as in FIG. 5. In addition, column 302 shows the address of each control word in read-only memory 184. To the right of each word are comments, giving, in abbreviated mnemonic form, symbols representing the operation of ALU 188 in column 304, the A and B bus sources and Z bus destination in column 306, the memory operation in column 308, the status bit settings in column 310, and (in conditional form, to be explained), the name of the statement to be accessed next in the read-only memory 184 in column 312. The numerical contents of the fields in the control words are given in hexidecimal numbers and in equivalent binary representation. Numbers in the control word name are in decimal notation.

In general, four kinds of addresses are represented in column 312: no address, unconditional, one condition, and two conditions. First, if no address field appears in the current control word, the next control word to be accessed is that appearing in the next address in the read-only memory; that is, access is sequential. In this case, no address appears in column 312.

Control words may be grouped in pairs, their addresses differing only in the value of one of the two low-order bits in the address. Such pairs are labeled as "TWOH" if the choice between the two words is conditioned by the value of the next-to-last bit (*bh*); they are labeled as "TWOL" if the choice between the two words is conditioned by the value of the low-order bit (*bl*). Further, control words may be grouped in four, their addresses differing in the value of both the two low-order bits in the address. Such words are labeled as a group "FOUR", and appear in read-only memory 184 in a sequence corresponding to the low-order bit values of the addresses:

00
01
10
11

Branching to any of these grouped control words may be unconditionally specified by the current control word; for instance, if *jh* contains 1 and *jl* contains 0, the branch address will contain 1 and 0 in the two low-order bits, without reference to any operating condition of the machine. Such an address may be that of a word in either a pair or a group of four.

Third, the value of either *jh* or *jl* may be such as to require the next address to depend on some operating condition, such as the value of a status bit, or the existence of a carry from the current ALU operation. In column 312, the latter branch condition, for example, is represented as

PR2, CC in which PR2 represents the TWOH pair of control words PR2 – 149 and PR2 – 150. The choice between these two control words depends upon the next-to-last bit in the address, as shown in column 302, and the value of this bit is determined by reference to the existence or non-existence of a carry ("CC").

Finally, the branch address may be represented as depending upon two conditions; for example (not shown in the PRIME routine),

RX6, S1,S0

This address refers to a group of four control words RX6, and the choice among them depends upon the current values of the status bits S1 and S0.

Beginning with control word PR1 – 147, and referring to the required sequence of operations (p. 24 ) and the commands associated with the field values (pp.19–24 ), AI = 0 states that S register 214 is the A-bus 218 source; BI = 1 states that constant field 260 of control word PR1 – 147 is the B bus 222 source; ZO = 3 states that V register 198 is the Z bus 232 destination. AOP = 6 states that ALU 188 is to perform a logical exclusive OR of the two inputs. AC = 0 requires the A bus input to be inhibited; BC = 1 permits information to pass to ALU 188 on the B line; BD = 0 states that the ALU operation is in binary mode. MOP = D causes the tape motor 15 to turn off. KK = F gives a constant field 260 value of (decimal) 15; ST = D sets all bits of S register 214 off unconditionally.

The operation directed by the control word PR1 – 147 results in no input to ALU 188 on A bus 218 (inhibited); constant field 260 of the current control word is input to ALU 188 on B bus 222, and the logical exclusive OR of the two inputs, which is the data on the B bus, is sent to V register 198 on Z bus 232. This results in a value of "F" (decimal "15") being set into V register 198. The comment column represents this operation in mnemonic form as "MVE = F, V".

The value JH = 1 requires a value of 1 in the next-to-last bit of the address of the next control word, and JL = 0 requires a value of 0 in the last bit. The address field of the next control word therefore contains

| 0 | F | 6 | bh | bl |
|---|---|---|---|---|
| 0000 | 1111 | 0110 | 1 | 0 |

which is divided from the right into 4-bit groups to obtain 00 0011 1101 1010

The first two zeros are ignored; the remaining bits have an equivalent hexidecimal representation of

3 D A, which is the address of control word PR2 – 150.

The pair of control words PR2 – 149 and PR2 – 150 are together denoted in the comment column as "TWOH". This represents a pair of control words together called PRIME 2, either of which may be accessed, depending on the value set into the next-to-last bit of the address in response to the JH field of the current control word. ("H" refers to "high order"). In proceeding from word PR1 – 147 to word PR2 – 150, a value of JH=1 requires that this bit be 1, thus addressing control word PR2 – 150.

In control word PR2 – 150, the memory operation required by MOP = 4 is first performed (see p. 24 ); four binary 1's (decimal 15) are sent to L register 200. Since L register 200 holds only two bits, this results in setting a value of 3 into this register. The value of constant field 260 is set into M register 202, and the contents of V register 198 are sent to N register 204.

The byte of storage located at the address that has been set into memory address registers LMN (200,202,204) is next read out into memory access registers R*a* and R*b* (210 and 212) and then into memory communication registers C*a* and C*b* (206 and 208). This read-out is destructive and has the effect of clearing that byte of storage. The mnemonic representing the memory operation is "RD XY", where " XY" stand for an address in storage whose contents are cleared. A value of AI=3 states that V register 198 is the A bus 218 source; BI = 0 states that no B-bus 222 input source is used; ZO = 3 states the V register 198 is the destination of output from ALU 188. AC = 1 passes the A bus 218 input to ALU 188; BC = 2 requires four binary 1's (decimal 15) to be sznt to ALU 188; BD = 0 requires the ALU operation to be in binary mode. AOP = 0 requires ALU 188 to add the input on A line 218 to the input on the B line 222.

During the first execution of control word PR2 – 150, for example, V register 198 contains the value 15 (decimal), set there by the execution of previous control word PR1 – 147. The addition is performed in binary mode;

```
 1 1 1 1  from V register 198
+1 1 1 1  from B bus 222
1 1 1 1 0
```

As only the right-hand four digits are retained, the result is a value of 14 (decimal) which is sent to V register 198 on Z bus 232; thus the result of the operation is to reduce the value of V register contents by 1. Note that this is done after the initial V-register contents are sent to N register 204. The mnemonic representing this ALU operation is "A, V,-,V", representing "Add contents of V to the complement of 0 and set result into V."

The address fields in ontrol word PR2 – 150 contain the values JH = 5, JL = 0. JH = 5 states that if the current ALU operation resulted in a carry, a value of 1 should be set into the next-to-last bit of the address of the next control word; if there was no carry, this bit is set to 0. JL = 0 states that the last bit of the address is set to 0 unconditionally. If there is a carry, the address that results is 0011 1101 1010, which is the address of control word PR2 – 150; that is, control word PR2 – 150 is executed repeatedly until a carry results from the ALU operation, resulting in a value of 0 in the next to last bit of the address, which gives as the result 0011 1101 1000, the address of control word PR2 – 149. The mnemonic representing this is "PR2,CC", indicating that one of the pair of words called "PR2" will be accessed, depending on the carry.

Control word PR2 – 149 thus is accessed only after control word PR2 – 150 has been executed repeatedly (looped). In control word PR2 - 149, AI = 0 states that S register 214 is the source for A bus 218; BI = 1 states that constant field 260 (KK = 1) in the current control word is the source for B bus 222; ZO = 4 states that K*a* register 190 is the destination of Z bus 232. MOP = 8 indicates that no memory operation is performed. AC = 0 inhibits the A bus, BC = 1 passes the contents of the B bus, BD = 0 indicates a binary operation; and AOP = 6 requires ALU 188 to perform a logical OR of the A and B inputs. ST = 3 sets status bit S3 on in register 214.

As is indicated by the mnemonic "MVE =1,KA", a value of 1 from constant field 260 is set into K*a* register 190 by this operation.

The address field gives JH = 1 and JL = 1. This results in values of 1 for each of the last two bits of the address of the next control word. This address is now

(00) 0011 1101 1011 which is the address of control word PR3 – 153.

Control word PR3 – 153 is one of a pair of control words, labeled as "PR3 TWOH", indicating that the pair of words are called PRIME 3 and that choice of one of them is determined by the value of the next to last bit in the address.

Control word PR3 – 153 resembles PR2 – 150, with the difference that constant field 260 now contains a value of 13 instead of 15. The MOP value of 4 again directs the destructive read-out of the byte of storage indicated by the contents of address registers LMN. When this has been done, the value contained in V register 198 is decreased by 1, as in the execution of control word PR2 – 150. The value JH = 5 again indicates that the address of the next control word to be accessed depends upon the existence of a carry from the current ALU operation. If there is a carry, control word PR3 – 153 is repeated. When no carry results, the address of the next word is 0011 1101 1001 which is the address of control word PR3 – 152.

According to control word PR3 – 152, ALU 188 performs a logical OR (AOP = 6) of the S register contents (AI = 0) and contents of constant field 260 (BI = 1 and BC = 1) in binary mode (BD = 0). The result is delivered to V register 198 (ZO = 3). Next, bit S1 in S register 214 is set on (ST = 2). Finally, any carry from the ALU operation is transferred to Q bit 240 (MOP = 9). The mnemonic for these operations is "MVE =2,V SETQ S1".

The address field values of JH = 1 and JL = 1 result in unconditional values 1 in the last two address bits (bh and bl), and the resulting address is that of a control word named "UP1A", which initiates an updating procedure that is not part of the PRIME routine. From this procedure the machine moves to a DISPLAY cycle in which it awaits commands.

FIG. 8 shows the contents of the various registers in Central Processor 182, together with memory registers 3F O-F, during the actual execution of the PRIME sequence of instructions. Initially, registers 3F O-F contain numbers used in some previous arithmetic calculation. In memory register 3F, a 0 in 3FO or 3FD is interpreted as a "plus"; a 1 as a "minus." When word PR1 – 147 is executed, a value of "F" (decimal 15, binary 1111) is set into V register 198; KBD bit 236 is set on in response to depression of PRIME key 34; and BH contains a value of 1. Control word PR2 – 150 is next addressed; the value "F" (decimal 15) is set into L register 200 (since L register 200 contains only 2 bits, this results in setting into it a value of 3), the constant field value "F" is set into M register 202 and the contents of V register 198 is set into N register 204. After readout to $C_a$ and $C_b$ Registers 206 and 208 and $R_a$ and $R_b$ Registers 210 and 212 of the contents of the indicated storage byte, the value in V register 198 is decreased by 1 to "E" (decimal 14), as previously described. Control word PR2 – 150 is executed repeatedly, as shown, until no carry results from the arithmetic operation of decreasing the value in V. The result of the final ALU operation is to place a value of "F" (decimal 15, binary 1111) in the V register. When no carry results, the value of bh (next to last bit of address of next control word) is 0.

The next control word executed is PR2 – 149 (MVE = 1,KA), and as shown, a value of "1" is set into the KA register. ST = 3 sets status bit S2 on. Address fields JH = 1, JL = 1 cause the accessing of control word PR3 – 153. Control word PR3 – 153 is repeated, while decreasing the value in V register 198 by one during each execution, causing the destructive read-out of storage registers 3DF through 3DO in memory 14. These registers contain a program counter and various internal status records, as will appear more fully in the description of a subroutine in what follows. When no carry results from the ALU operation of decreasing the contents of the V register, the resulting contents are "F", as shown; the next-to-last bit (BH) of the address becomes 0, and the control word PR3 – 152 is accessed. This word (MVE = 2,V) sets a value of 2 into V register 198, and sets Q bit 240 if there is a carry (here there is none). Finally word UP1A (not shown) is executed, initiating the updating procedure, not explained here in detail.

Upon completion of the updating procedure (including a procedure to update the program counter), the calculator is placed in an initial DISPLAY routine, which causes the *x* and *y* displays 14 and 16 to display all zeros, the present contents of registers 3FO-F. This routine includes a control word,

DIS 1 6 1 6 5 1 1 0 0 C 9 107 0 0, whose status field value of 9 as indicated above causes the KBD bit 236 to be set to zero. The calculator then enters a cycle mode DISPLAY routine, during which the calculator continues to display the contents of registers 3FO-F. This DISPLAY routine includes a control word,

DIS 7D 7 0 7 6 1 0 0 1 0 0 00C 6 3, whose *jh* field value of 6 requires the value of KBD bit 236 to be set into the next to last bit (*bh*) of the address field for the next control word. So long as the value of KBD bit 236 remains 0, this branch condition results in a loop through the DISPLAY cycle. When the user of the calculator enters a command by depressing a key on keyboard 12, KBD bit 236 is set equal to 1. The next execution of control word DIS 7D, during the cycling through the DISPLAY rountine, sets this value of 1 into the *bh* address field, causing a branch out of this loop to control words which test the contents of external status (D) register 216, to determine the mode (run, learn, learn print, list program) as controlled by the mode keys 18, 20, 22 and 24. The contents of D register 216 determine further branching. In particular, when the mode is RUN, control branches to a DECODE procedure to determine the nature of the entered command.

All commands, including a subroutine call, may be entered to central processor 182 either from keyboard 12 by depressing appropriate keys, or from a program previously loaded into memory 180. For example, a subroutine program may be stored and the code 00 (hexidecimal notation) may be assigned as its name; the subroutine may thereafter be called by depressing the 00 key 500 on keyboard 12. The calculator will thereupon execute the subroutine, and upon completing the subroutine, whose last command is always "RETURN," will return control to keyboard 12 to await (in DISPLAY mode) depression of another key to enter another command. Alternatively, the same subroutine may be called by a command within a stored program, and when the subroutine is completed, control will return to the program in memory rather than to the keyboard. These alternative choices in accessing a subroutine will be explained in detail.

FIG. 9 shows the contents of all the registers in core memory 180 in an initial state after a PRIME routine. Each register contains a byte comprising two half-bytes, each of 4 bits. Registers 3F O-F through 3C O-F are not available to the user of the calculator, but are reserved for internal use during execution of commands. In particular, the contents of registers 3F O-F are normally displayed in RUN mode in the *x* and *y* displays 14 and 16 of the calculator; the high-order half-bytes appear successively in *y* display 16, and the low-order half-bytes appear in *x* display 14. The 3E O-F registers are used for double-precision arithmetic. The high-order half-bytes of registers 3D O-F are used to store the internal program count and various status values, to be explained more fully in what follows.

The low-order half-bytes of registers 3D O-F are used in LEARN mode operation of the calculator, to contain a three-digit Program Counter and a four-digit code representing the command stored at the place designated by the Program Counter. Initially, the program step is 000, corresponding to the first available register in memory 180, 3BF. The Program Counter is incremented and the three-digit values with corresponding codes are displayed only when stepping through the program in LEARN mode. For purposes of the description of the subroutine call and return, these registers are shown to contain all zeroes.

The registers 3C O-F are used to store return addresses and for other temporary storage. Beginning with register 3BF, the user may address the storage directly. Loading of a program proceeds from right to left. In FIG. 9, a short program is shown stored in registers 3BF through 0 and 3AF through 3.

This program begins in memory register 3BF with the code "4 8", which represents the command "MARK", signalling the beginning of a program. The second code "0 0" in 3BE is the name of the program, and the remaining codes are the commands to be executed successively when program "0 0" is called. A further subprogram is included in this program, tagged by the code "4 8" in register 3A6, and given the name "0 2". This subprogram comprises the single operation "7 E" (Recall Residue) followed by a "RETURN" code, "5 B". In the course of the subroutine "0 0", this subprogram is called by the code "0 2", stored in register 3A8, followed by the "RETURN" code "5 B" in 3A7.

When subroutine "0 0" is called from the keyboard, by depressing special function key 500, the central processor, in cycling through the DISPLAY routine, detects that KBD bit 236 has been set to 1, signalling the entry of a command, whose specific nature has not yet been determined. The value of KBD bit 236 causes branching to control words that cause read-out of the contents of memory registers 3F D, E, and F, which are the positions in which any 2-digit exponent and its sign would appear in the *x*- and *y*-displays (14 and 16) of the calculator. When 0's are found in these positions, branching is to control word DISPLAY 14A, (DISPLAY 14A) 1 0 1 6 1 0 0 4 D D 107 2 1, which causes central processor 182 to set all status bits in S register 214 to 0, and to read out the contents of memory register 3D3. The high-order half-byte in this memory register represents the operating status of the calculator. If this half-byte is 0, the machine is determined to be in display mode; if it is 1, the machine is in program mode. This bit is always zero unless set to 1 during execution of a stored program. In the example being described, the subroutine 0 0 has been called from the keyboard, and this half-byte is therefore found to be 0. The value of this half-byte is now used to determine further branching; control word DECODE 345, (DECODE 345) 6 1 0 5 1 1 0 0 C 0 145 1 0, causes the contents of this half-byte to be logically AND'd with the constant field value, hexidecimal "C" (decimal "12"), of the word, and the resulting value "0" is transmitted to the 4-bit S register 214. In response to this transmitted value, the two high order status bits S2 and S3 in register 214 are both set equal to zero.

The next branch in control will be to one of four words, determined by these settings of S2 and S3:

| | |
|---|---|
| DECODE **360** | 4 1 6 6 1 1 0 8 7 0 0B4 1 4 |
| DECODE **361** | 0 1 3 6 0 1 0 8 7 0 022 0 1 |
| DECODE **362** | 1 0 1 6 1 0 0 4 D D 157 1 1 |
| DECODE **363** | 6 0 6 4 1 2 0 4 D 0 150 0 1 |

Possible settings of the two high-order bits in status register 214 and the corresponding branches are:

| S3 | S2 | |
|---|---|---|
| 0 | 0 | to Control Word DECODE **360**, then to "Normal Decode"procedure |
| 0 | 1 | to Control Word DECODE **361**, then to "Double Command"procedure |
| 1 | 0 | to Control Word DECODE **362**, then to "Direct" procedure |
| 1 | 1 | to Control Word DECODE **363**, then to "Search" procedure |

In the present example, both S2 and S3 are found to be 0, and the branch is therefore to word DECODE 360.

The command "0 0", which has been entered through keyboard 12 into Ka and Kb registers 190 and 192, must now be decoded by the calculator to determine what particular operation must be performed.

This is accomplished by a sequence of three control words that cause the contents of K*a* and K*b* registers 190 and 192 to be OR'd with constant field values and use the resulting values to determine address branching to the control words appropriate to carrying out a command to call a subroutine. These control words cause the contents of registers 3CO-F to be shifted three places to the right (to save any address that may be stored there), after which control branches to a SEARCH AND RETURN procedure for locating the called subroutine in memory.

The operating status (0) stored in 3D3 is now used again to determine the sequence of operation of the machine. The SEARCH AND RETURN control words 704 and 705, (SAR 704) 3 0 3 0 1 2 0 4 D 0 (no address field)
(SAR 705) 6 0 6 6 1 0 0 0 0 A (no address field)

cause the high-order half-byte to be read out of 3D3 and its value (which is still 0) to be used to set the low-order status bit SO in register 214 equal to zero. If the value stored in 3D3 were 1, the status bit SO would be set equal to 1.

The SEARCH AND RETURN procedure next stores the current address, "3BF", currently appearing in memory registers 3D0 through 3D2 (high-order half-bytes); this will be the address to which control returns after execution of the called subroutine "0 0". Beginning with the lowest digit "F", this storing of the return address is accomplished by a sequence of control words, of which the first two are accessed without branching:

(SAR 4-706) 1 0 4 6 1 0 0 4 D 3 (no address field)
(SAR 707) 6 0 6 6 1 0 0 0 0 4 (no address field)

These two words cause the contents of memory register 3D2 to be read out into the $C_a$ and $C_b$ registers 206 and 208. The next word, also accessed without branching, (SAR 708) 3 0 3 0 1 2 0 5 C 0 02B 5 2 clears the memory register 3C2, and decrements the lowest digit in the current register number from 2 to 1.

The next control word (causing storage of the return address digit into the 3C register) will be one of a group of four words:

(SAR 5-710) 6 1 7 6 1 1 0 1 8 0 145 1 0
(SAR 5-711) 6 0 7 6 1 0 0 1 0 0 145 1 0
(SAR 5-712) 6 0 7 6 1 0 0 1 0 0 150 0 0
(SAR 5-713) 6 0 7 6 1 0 0 1 0 0 150 0 0

Branching to one of these control words depends upon both the setting of status bit SO (previously set equal to 0 by control word SAR 705 in response to the operating status found in register 3D3) and on the result of decrementing the lowest digit of the register number. As a carry results from this decrementing, branching is to control word SAR 712, which causes the "F 0" from register 3D2 to be written as "0 F" into register 3C2.

Control words SAR 4-706, SAR 707, SAR 708, and SAR 712 are next repeated to cause the digits "B 0" from register 3D1 to be written as "0B" into register 3C1.

The words SAR 4-706 and SAR 707 then cause the highorder digit 3 of the current address to be read out of register 3D0, and word SAR 708 clears register 3C0 and decrements the lowest digit of the address. This decrementing (from hexidecimal 0 to "F", or from binary 0000 to 1111) does not result in a carry, and this no-carry condition, together with the value 0 of the low-order status bit SO, previously set by control word SAR 705 in response to the operating condition digit in register 3D3, determines a branch condition to the next control word, SAR 710. This control word causes an 8 (binary 1000) to be added to the 3 (binary 0011) of the current address field to give 1011 or hexidecimal "B". The byte 30 is caused by control word SAR 5-710 to be written as 0B into 3C0. Thus we have:

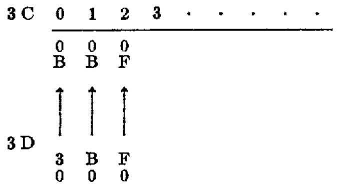

This sequence of SEARCH AND RETURN operations has stored the current address, "3BF," as "BBF," for use as a return address after completion of the called subroutine.

memory 180 will be searched to find the subroutine "0 0".

The values of status bits S2 and S3, set to 1 unconditionally by execution of control words SAR 4-706 and SAR 707, are now used to determine a branch to control words in the SEARCH procedure, during which The control word SEARCH 542, (SEARCH 542) 0 1 6 6 0 1 0 0 1 0 (no address field)

causes a 1 to be entered into the high-order half-byte of memory register 3D3, representing that the machine is now in "program" mode. The contents of the currently addressed memory register 3BF are now read out and identified as "MARK" ("4 8"). The current address is decremented and the contents of register 3BE are read out for comparison with the subroutine call 00. As these are found to agree, the current address stored in 3D 0-2 is decremented to "3BD", the address of the first command in the stored subroutine.

The state of the memory 180 at this point is:

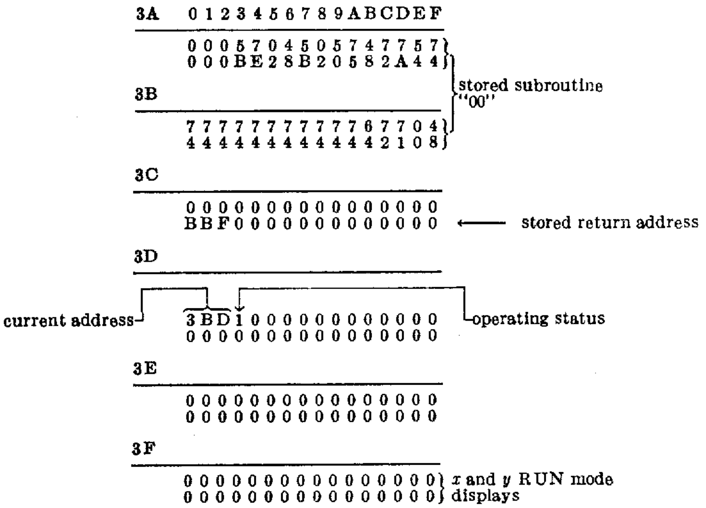

In the course of executing the stored subroutine "0 0 "the command "0 2", stored in memory register 3A8, will be reached. This command calls the subroutine "0 2",and initiates a search for the combination of codes "4 8" followed by "0 2", which are stored in memory registers 3A6 and 3A5. Subroutine 02 is in this case called from within a program. When this command is accessed, the operating condition digit in memory register 3D3 has already been set to 1 (as already described), and has remain 1 while the successive commands of the 00 program have been executed.

The command 02 is decoded, precisely as the command 00 was decoded in the example already described. When the command has been identified as the name of a subroutine, the contents of registers 3C O-F are again shifted three places to the right; control words SAR 704 and SAR 705 again cause the high-order half-byte in 3D3 to be read out; as the value is now 1 instead of 0, however, the status bit SO in status register 214 is set equal to 1. Therefore when the current address, "3A8", is stored in memory registers 3C 0-2, the first part of the loop of control words is

SAR 4-706
SAR 707
SAR 708 as before, but the choice of control word from the SAR 5 group of four words is now determined by the carry condition and the value SO=1. When the high order digit of the current address (3) is stored, the value of SO determines that the branch is to control word SAR 711 (instead of to SAR 710 as it was when the subroutine was called from the keyboard) and the address "3A8" is stored in register 3C0 unaltered. Further control words now cause a search for the combination of codes 48 and 02, and the address "3A4" of the next command following the combination is stored as the current address in register 3D0. The relevant portions of memory 180 now have this configuration:

```
              3 A  0 1 2 3 4 5 6 7 8 9 A B C D E F
              ------------------------------------
                   0 0 0 5 7 0 4 5 0 5 7 4 7 7 5 7
                   0 0 0 B E 2 8 B 2 0 5 8 2 A 4 4

              3 B
              ------------------------------------
                   7 7 7 7 7 7 7 7 7 7 7 6 7 7 0 4
                   4 4 4 4 4 4 4 4 4 4 4 4 2 1 0 8

              3 C
              ------------------------------------
                   0 1 2 0 0 0 0 0 0 0 0 0 0 0 0 2
                   3 A 8 B B F)0 0 0 0 0 0 0 0 0 0
return   <--------------'   '----------------> return address
address for "02"                               for "00"

              3 D
              ------------------------------------
current address  <-- 3 A 4 1 0 0 0 0 0 0 0 0 0 0 0 0 --> operating status
                     0 0 0 0 0 0 0 0 0 0 0 0 0 0 0 0

              3 E
              ------------------------------------
                   0 4 4 4 4 4 4 4 4 4 4 0 0 0 0 0 } storage from arithmetic
                   0 0 0 0 0 0 0 0 0 0 0 4 4 0 0 2 } work of "00" subroutine

              3 F
              ------------------------------------
                   0 1 2 0 0 0 0 0 0 0 0 0 0 0 0 2 } x, y displays
                   0 4 4 4 4 4 4 4 4 4 4 4 4 0 0 2 }
```

The values in memory registers 3E and 3F are now nonzero, and represent the results of arithmetic computations performed during the execution of subroutine 00.

After the execution of the 02 subroutine, called from within 00 subroutine, the next command to be accessed in the code "5B", representing "RETURN", stored in memory register 3A3. This is the return from the 02 subroutine to the place from which it was called.

After this command has been decoded, appropriate control words cause the address "3A8", stored in memory registers 3C 0-2, to be written into memory registers 3D 0-2. Control word RETURN 772,

RETURN 772) 7 1 6 5 1 1 0 0 7 0 151 1 0, by ANDing the high-order hexidecimal digit of the address with the value 7, causes it to be written as 3, regardless of whether it was 3 or "B" initially. Control word RETURN 2A:

(RETURN 2A) 7 1 5 5 1 1 0 8 8 0 02F 0 1, then AND's the original high-order hexidecimal digit of the address with 8, and saves the resulting value in KB register 192. In the first RETURN operation, the high order digit is 3; the binary operation is

0011
1000 0000, giving a result of zero, to be saved in KB register 192. The contents of memory registers 3C 0-F are then shifted 3 places to the left, bringing the first return address ("BBF"), saved when the subroutine 00 was called, into the left-most position in the 3C registers.

When the shift has been completed, control word RETURN 5

(RETURN 5) 5 0 5 6 1 0 0 4 D 0 030 3 4 causes the calculator to test the value saved in KB register 192. When the saved value is found to be zero, the value of the operating status bit in memory register 3D3 is retained as 1, and control branches to an internal updating procedure which causes the accessing of the next stored command.

The state of memory 180 is now:

```
3A    0123456789ABCDEF
      0005704505747757
      000BE28B20582A44

3B    0123456789ABCDEF
      7777777777767704
      4444444444442108

3C
      0120000000000002
      BBF000000000003A

3D
      3A81000000000000
      0000000000000000

3E
      0444444444400000
      0000000000044002

3F
      0120000000000002
      0444444444400000
```

The next command ("5B"), when decoded, proves to be the command "RETURN". This is the return from the 00 subroutine to the place from which it was called, which was the keyboard.

In response to this command, the return address "BBF", stored in memory registers 3C 0-2, is read out and is written into memory registers 3D 0-2.

This code "5B" is decoded and the same series of instructions are performed as for the first RETURN procedure, up to the control word RETURN 2A. At this point, the result of ANDing the high-order hexidecimal address digit "B" with the value "8" gives the non-zero result "8" to be stored in KB register 192. The previously shift-left procedure is again performed. Control word RETURN 5 again tests the value saved in KB register 192, and when this value is found to be non-zero, the value of the operating status bit in memory register 3D3 is rewritten as 0, indicating that the machine is no longer in program mode and that control returns to the keyboard. Control branches to an updating and display procedure, following which the calculator ceases operation. The state of memory 14 is now:

```
3A      0123456789ABCDEF
        0005704505747757
        000BE28B20582A44
3B
        7777777777767704
        4444444444442108
3C
        0120000000000002
        000000000003A0BB
3D
        3BF0000000000000
        0000000000000000
3E
        0444444444400000
        0000000000044002
3F
        0120000000000002
        0444444444400000
```

It will be appreciated that the type of operation described here for calling a subroutine from within a program and returning to the next step in the program may equally well be employed to permit one subroutine to be called from within a second subroutine. The successive RETURN addresses will then be "stacked" three of more deep in registers 3C; if the initial call was from the keyboard these registers will have a configuration such as

```
3C 0 0 0 0 0 0 0 0 0 0 0 0 0 0 0 0
   3 8 4 3 A 0 B B F 0 0 0 0 0 0 0
```

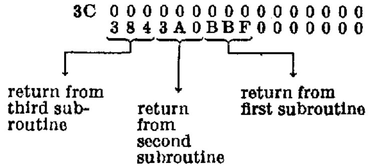

The operation of the recall residue key 138, giving to the user of the calculator of the invention the option of obtaining double precision results, will be described for the case when it is employed after the ADD operation. Suppose it is desired to add together the following two numbers:

```
444 444 444 444 .
            44 .444 444 444 4
-----------------------------
444 444 444 488 .444 444 444 4
```

It will be seen that the result comprises more than 12 digits and therefore cannot all be displayed in *y*-display 16, which provides, as has been described, a display including a sign, 12 digits, and two-digit exponent with sign. In the operation of this calculator, however, the first 12 digits are displayed, and means are provided for saving the remaining digits of the answer; when recall residue key 138 is depressed, these saved digits are displayed in *x*-register 14, replacing the number already displayed there, which is then lost (unless it is first stored in a memory register). This recall residue operation will now be described.

To accomplish the addition, the first step is to enter the first quantity to be added. This is done by depressing Enter 4-key 74 twelve successive times, followed by Set Exp key 92 and number entry keys for the two digits of the exponent. After depression of Move-Up key 132, *y*-display 16 now shows:

+ .444 444 444 444 + 12

This number appears in memory register 3F O-F, high order.

The second quantity to be added to the first is entered by depressing Enter 4-key 74 twelve times, followed by Set Exp key 92 and two digits of the exponent, giving in *x-display 14 and in memory register 3F O-F (low order)*

+ .444 444 444 444 + 02

Memory registers 3C, 3D, 3E and 3F now have the following configuration:

```
3CO     0000000000000000
        0000000000000000
3DO     3BF0000000000000
        F000FFF00F00FFFF
3EO     0000000000000000
        0000000000000000
3FO     0444444444444012    y
        0444444444444002    x
```

(The digit 0 in registers 3F0 and 3FD is interpreted as a plus; "1" would represent a minus).

Add key 98 is depressed, generating the code 60 which in entered in $K_a$ and $K_b$ registers 190 and 192, and setting KBD bit 236. The central processor, which after the last entry of a digit has been in the cycle mode of the DISPLAY routine, as previously described, detects the on condition of KBD bit 236, and this value is used to cause a branch out of the DISPLAY routine. A DECODE routine, similar to that already described for the subroutine call 00 is executed. When the code 60 has been interpreted as "Add", the content of memory register 3D6 is tested. This register (high order) holds a value representing direct/indirect status. During the present operation it contains 0, indicating that the Add operation does not involve a direct/indirect operation.

The high order digit of the Add code 6, is moved into Status Register 214 (giving the content 0110) for use in directing further branching to control words. The low order digit is tested and its value (0) is used, together with the value of status bit S2 in Register 214, to determine a branch to one of four control words determining the subsequent procedure. The accessed word leads first to a "Save *x*" routine, in which the upper and lower registers 3E 0-F are cleared, and the contents of 3F 0-F (low order), representing the second entered number to be added, are written 3F 0-F (low order). "Save x" is followed by an "Align" procedure; during this procedure, it is first determined that the first digit of *x* and the first digit of *y* (in memory Register 3F1, high and low order) are both non-zero. This condition causes a branch to words that determine that the signs of both exponents are "plus"; status bit SO in S Register 214 is set equal to zero; and bits S1 and S3 are set on, when this condition is determined, giving for the content of S Register 214:

| S3 | S2 | S1 | S0 |
|---|---|---|---|
| 1 | 0 | 1 | 0 |

The two exponents must now be compared, to determine how many digits of the numbers in the *x* and *y* displays can be aligned. This is accomplished by the sequence of control words ALIGN 1161, ALIGN 1167, ALIGN 1174, and ALIGN 1177, together with eighter ALIGN 1183 or ALIGN 1184, in the following manner. Control word ALIGN 1161, (ALIGN 1161) 1 0 1 6 1 0 0 4 E 0 11C 3 0, causes memory register 3EF, containing the second digit of the exponent on *x* (2), to be read into $C_a$ and $C_b$ registers 206 and 208. The value of status bit S3 (1), previously set on, now determines the branch to ALIGN 1167,

(ALIGN 1167) 7 0 5 6 1 0 0 1 0 0 047 2 2, which moves the lower order half-byte (2) from $C_b$ Register 208 into $K_b$ Register 192. The values of status bits S1 and S0 previously set to 1 and 0 causes the branch to the next word, ALIGN 1174,

(ALIGN 1174) 0 1 3 6 0 1 0 2 E 8 0D5 0 5, which causes memory register 3FF, containing (high order half-byte) the second digit of the exponent on *y*, to be read into $C_a$ and $C_b$ registers 206 and 208, and sets bit S3 = 0. The next word, ALIGN 1177, accessed when Q bit 240 is found to be zero, (ALIGN 1177) 6 0 6 6 1 0 0 0 0 3 048 3 3, restores the read-out values to register 3FF, and sets S2 = 0 after determining the jump address of the next control word.

The next word, ALIGN 1183, is accessed when status bits S3 and S2 in S register 214 are both zero:

(ALIGN 1183) 6 5 4 4 1 3 1 8 0 4 046 0 0.

This word causes the second digit of the exponent on *x* (2) to be decimally subtracted from the second digit of the exponent on *y* (2), and the result (0) is stored in $K_a$ register 190. A carry (resulting from the operation of subtraction as performed by ALU 188) is saved in SC bit 228. Bit S3 in Register 214 is set on.

The next word, ALIGN 1161, (given above) is accessed unconditionally, and is followed, as above, by ALIGN 1167, ALIGN 1174, and ALIGN 1177. Together, these four words read out the first digits of the exponents on *x* and *y* into $K_b$ and $C_a$ registers 192 and 206 respectively.

Now the values of S2 (set to 1 during the comparison of the second digits) and S3 (set to 0 by ALIGN 1174) determine a branch to word ALIGN 1184:

(ALIGN 1184) 6 5 5 3 1 3 1 8 0 B 11C 5 1, which causes the first digit of the *x* exponent (0) to be decimally subtracted from the first digit of the *y* exponent (1); the result (1) is stored in $K_b$ register 192. Since the result is non-zero, status bit S1 is set to 0.

These "difference values" resulting from subtracting the *x* exponent from the *y* exponent are used to determine branching through a series of control words (ALIGN 1192) 5 0 6 0 1 2 0 8 0 7 049 2 4
(ALIGN 1198) 4 1 5 0 1 1 0 8 A 0 11D 5 1
(ALIGN 1202) 5 1 6 1 1 1 0 8 3 7 11E 5 0
(ALIGN 1211) 0 1 4 2 0 1 0 8 D 8 11E 0 1 which result in deriving from the value 0 in $K_a$ register 190 the value 3, which is set into V register 198 and used to determine the first digit of *x* to be saved in the double precision routine. (The value 3 is derived by a series of operations: 0000 + 1010 (from constant field of 1198) = 1010; 1101 (from constant field of 1200) − 1010 = 0011.

A loop of control words in the DOUBLE PRECISION Routine is accessed unconditionally after the value 3 is set into V Register 198, and is executed repeatedly, incrementing the contents of V by 1 each time, until the contents of V reach the value "F" which is incremented to 0 (1111 + 0001 = (1)0000). This loop accomplishes the writing of 3E 3-F, low order, into 3E 3-F, high order, together with the sign of *x*, giving for the contents of memory register 3E:

| 3E | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| | 0 | 0 | 0 | 4 | 4 | 4 | 4 | 4 | 4 | 4 | 4 | 4 | 0 | 0 | 2 | |
| | 0 | 4 | 4 | 4 | 4 | 4 | 4 | 4 | 4 | 4 | 4 | 4 | 0 | 0 | 2 | |

The contents of V register 198 are now reset to 3 and tested and, because the transfer *x* began with its third digit, a series of words are accessed that write the first two digits of *x* (in 3 E 1 and 3 E 2, low order) into 3E B and 3E C (low order), after which the remaining registers 3E 0 through 3E A (low order) are cleared. The state of memory 180 is now:

| | | | |
|---|---|---|---|
| 3C0 | 0000000000000000 | | |
| | 0000000000000000 | | |
| 3D0 | 3BF0000000000000 | | |
| | 0000000000000000 | | |
| 3E0 | 0004444444444002 | ← | last 10 digits of x |
| | 0000000000044002 | ← | first 2 digits of x, aligned with y |
| 3F0 | 0444444444444012 | ← | y |
| | 0444444444444002 | ← | x |

The actual addition is now performed, by a loop of control words (ADD 1244) 1 0 1 6 1 0 0 4 3 0 161 1 1
(ADD 7 1246) 7 0 4 6 1 0 0 1 0 0
(ADD 1247) 3 0 3 0 1 2 0 2 0 B 04B 3 5
(ADD 1251) 6 4 6 3 1 1 1 0 0 0 11F 2 0 which cause successive read out and decimal addition of the digits in 3EC-1 (low order) to the digits in 3FC-1 (high order), placing the result in 3FC-1, high order. As there is no carry from the final addition, the value 4 from a constant field is set into Adjust Exponent status register 3D4, and the next branch is to control words of a zero Adjust routine; in this routine, the first digit of the addition result (in 3F1) is found to be non-zero, which determines a branch to a series of control words for an Adjust Exponent routine. The two digits of the exponent on *y* (12) are not altered, since there were no leading zeroes and no carry after the addition.

As the first digit of the exponent (1) is non-zero but less than (decimal) ten, a branch is determined to a series of control words that, by testing appropriate status bits (in 3D4 and 3D9, high order), determine that the exponent need not be adjusted for multiplication or division and that no log function must be taken into account in determining the exponent. These status conditions then cause a branch to control words that cause read-out of the contents of memory registers 3E, beginning with 3E1, until the first digit of the saved portion of *x* is found. The location in which it is found (3E3) determines a "shift number" of 2, and this value is then used in a series of operations to shift left by two places the number in 3E 1-C (high order). This number has now been left-justified. The exponent +2 is reduced to +00. Since reference to Adjust Exponent status in 3D4 and Log Status in 3D9, as previously described, determines that no further adjustment of the x-exponent is required, the exponent of $x$ is not further altered.

The state of memory 180 is now:

```
3C0     0000000000000000
        0000000000000000
3D0     3BF0400000000000        adjust exponent status
        0000000000000000
3E0     0444444444400000   ←    saved part of x, left-justified
        0000000000044002
3F0     0444444444488012   ←    result of addition in y
        0444444444444002   ←    x unaltered
```

After necessary conversion of hexidecimal notation to decimal notation, the contents of registers 3F0-F are displayed in $x$ and $y$ displays 14 and 16, KBD bit 236 is set off, and the calculator cycles through a DISPLAY routine, as previously described.

Depression of Recall Residue key 138 generates the code "7E", which is set into $K_a$ and $K_b$ registers 190 and 192, and sets KBD bit 236 on. The state of KBD bit 236 is detected by the central processor, as previously described, and is used to determine a branch, as described for other commands, to the DECODE routine. This routine proceeds as previously described for 00, including testing of program/display status in 3D3 (here 0) through control word DEC 15 (previously given). At this point, however, the values of the two code digits ("7E") are used to determine branching through the series of control words (DECODE 386) 5 0 0 6 1 0 0 8 0 0 012 2 2
(DECODE 391) 0 1 1 6 0 1 0 8 F D 013 2 2
(DECODE 403) 0 1 2 6 0 1 0 9 E 1 0B7 0 1
(DECODE 454) 0 1 3 6 0 1 0 8 F D 019 2 2 which set the contents of TUV registers 194, 196, 198 to "FEF" and set the contents of status register 214 to zero after determining the next branch. This branch is to one of four control words, determined by status register bits S1 and S0, whose values have been set in response to the code "7E"; the selection from these four words of word REO 462, (REO 462) 1 0 1 6 1 0 0 2 0 0 0E0 0 5, initiates the operations which actually perform the Recall Residue command.

These operations are controlled by the control words (REO 462) 1 0 1 6 1 0 0 2 0 0 0E0 0 5
(RE 1407) 6 0 6 6 1 0 0 0 0 0 167 0 1
(RE2 1409) 3 0 3 0 1 2 0 5 F 0 122 5 1
(RE 1412) 6 0 6 6 1 0 0 1 0 0 019 0 1
(RE 1411) 6 0 6 6 1 0 0 1 0 0 0E3 0 0

These operations cause read-out of memory registers 3E, whose high-order half-bytes contain the saved part of $x$, and cause these high-order half-bytes to be written into registers 3F, low-order half-bytes, replacing $x$, beginning at 3EF and 3FF; the contents of V register 198 are decremented after each write operation. A loop comprising the first four words is executed until no carry is generated by decrementing the contents of V, that is, until the value in V changes from 0 to "F". When this condition occurs, the branch from word RE2 1409 is to RE 1411 instead of RE 1412. This word (RE 1411) causes the sign of the saved part of $x$ to be written into 3F0 and then determines a branch to normal End of Arithmetic routines. The state of memory 180 is now:

```
3C0     0000000000000000
        0000000000000000
3D0     3BF0400000000000
        0000000000000000
3E0     0444444444400000
        0000000000044002
3F0     0444444444448812   ←   12 digits of answer in y
        0444444444400000   ←   remaining 12 digits in x
```

After program/display status register 3D3 is tested and found to contain 0, hexidecimal to decimal conversion is performed and the contents of registers 3F 0-F are displayed in x and y displays 14 and 16.

Prime key 34 is now depressed, x and y displays 14 and 16 will be zeroed by clearing memory registers 3F 0-F, and the high-order half-byte in 3D5 will be zeroed during the clearing of 3D 0-F. However, registers 3E 0-F are not cleared by PRIME, but will be written over during later operations of the calculator. That state of memory 180 after PRIME is:

```
3C0     0000000000000000
        0000000000000000
3D0     3BF0000000000000
        F000FFFF00F00FFF
3E0     0444444444400000
        0000000000044002
3F0     0000000000000000
        0000000000000000
```

It will be appreciated that the Recall Residue command, through input through keyborad 12 in the example here described, may equally well be given in a stored program by storing the code "7E". After this code has been fetched, decoded and executed during execution of the program, the program/display status register 3D3 (previously set to 1 during execution of earlier portions of the program) is tested and is found to contain 1 in the high-order half-byte instead of 0 as in the example described. This value then determines a branch to control words which cause another code to be fetched from memory 180, rather than to the control words which initiate the DISPLAY cycle.

Although this example has shown the operation of Recall Residue key 138 after an Add operation, it will be appreciated that, with appropriate differences in zero adjustment and exponent adjustment, the operation after subtraction and multiplication is basically the same. When used after division, the Recall Residue command causes the remainder, after twelve digits of quotient have been calculated, to be displayed in $x$-display 14. Using this remainder and the original divisor, another twelve digits of quotient may then be generated. To preserve the first twelve digits of the quotient, Store Direct key 114 is used to store the divisor in a selected memory register, and Divide Direct key 154 is used to generate a quotient which will be displayed in $x$-display 14. These twelve digits are now added to the quotient in $y$-display 16 to give 24-digit accuracy. If greater accuracy is desired, Recall Residue key 138 may be used again to obtain the current remainder, and the process may be repeated.

While a particular embodiment of the invention has been shown and described, various modifications thereof will be apparent to those skilled in the art and therefore it is not intended that the invention be limited to the disclosed embodiment or to details thereof and departures may be made therefrom within the spirit and scope of the invention as defined in the claims.

What is claimed is:

1. A programmable desk type calculator comprising computation means having an input register, a plurality of registers for storing numerical values, an arithmetic unit for operating on numerical values stored in said registers in accordance with instructional values and producing a result, and bus means connecting said input register and said arithmetic unit to said plurality of registers, a keyboard connected to said input register of said computation means, said keyboard having a plurality of manually operable first key elements for entering numerical values into said input register of said computation means, and a plurality of manually operable second key elements for entering instructional values into said input register of said computation means, a first memory having first register means connected to said arithmetic unit for storing the value of the result of an operation by said computation means, second register means for storing a sequence of said instructional values, and third register means for storing second register address information for use in controlling the execution of a sequence of instructional values by said computation means, display means connected to said first register means, said display means having a predetermined number of display positions for displaying the result of an operation by said computation means, a second memory for storing a plurality of predetermined control words, each said predetermined control work including a predetermined set of fields, said fields including a plurality of computation means control fields and a further field for use in determining the next control work to be processed, address setting means connected between said computation means and said second memory, said second memory being addressable only from said computation means through said address setting means, said computation means including means responsive to the control fields of each control work for controlling the operation of said computation means, one of said control fields of each said control work controlling the transfer of numerical values to said arithmetic unit from said registers, a second of said control fields of each said control word controlling transfer of numerical values from said arithmetic unit to said registers, and a third control field of each said control work controlling the transfer of numerical values between said computation means and said first memory, means in said computation means and connected to said adress setting means and responsive to a single instructional value for deriving an address value related to said single instructional value, and setting said address value into said address setting means, said second memory providing a series of control words in response to said address value, said computation means being operative in response to said series of control words to perform the operation specified by said single instructional value and to store the result of said operation in said first register means, and means for successively applying the control words in said series to said computation means to perform said specified operation.

2. A calculator as claimed in claim 1 wherein said second register means is connected to said keyboard and is directly addressable through said keyboard and said third register means is connected to said computation means and is directly addressable only through said computation means.

3. The calculator as claimed in claim 1 and further including status indicator means for preventing response of said computation means to an instructional value specified by one of said key elements, means connected to said keyboard and responsive to actuation of one of said instructional value key elements for selecting a first control word in said second memory and for setting said status indicator means and means connected to said arithmetic unit and responsive to a field of one of said predetermined control words for clearing said status indicator means and enabling said computation means to respond to another instructional value entered by one of said manual key elements.

4. The calculator as claimed in claim 1 wherein each said control field includes a first field for determining the source of one input to said arithmetic unit and a second field for determining the source of a second input to said arithmetic unit, and said control word further includes a field for specifying the mode of operation of said arithmetic unit.

5. The calculator as claimed in claim 1 and further including a plurality of reference storage means, including status register means, for storing a plurality of current status reference quantities, and wherein said address setting means is responsive to said further field in said control words and to said current status reference quantities for determination of said next control work.

6. The calculator as claimed in claim 1 wherein said stored sequence of instructional values further includes an initial sequence dsignating value and said manually operated key elements further include a manually operable sequence-calling key element for entering a sequence-calling value, corresponding to an initial sequence-designating value, said calculator further including means responsive to said sequence-calling value for finding in said first memory said corrresponding initial sequence-designating value and for initiating operation of said calculator according to said stored sequence of instructional values corresponding to said initial sequence-designating value.

7. The calculator as claimed in claim 6 wherein said first memory further includes means for storing an operating status reference quantity, said operating status reference quantity having a first value representing operation of said calculator in response to a sequence-calling value entered through said keyboard, and a second value representing operation in response to a sequence-calling value stored in said first memory, and status register setting means responsive to said control words and to said operating status reference quantity, for storing into said status register a particular current status reference quantity representative of the value of said operating status reference quantity, for determining successive control words to be executed.

8. The calculator as claimed in claim 7 and further including internal memory location indicating means for generating and storing a value representing the location within said first memory of the instructional value currently accessible for controlling the operation of said calculator, means responsive to said sequence-calling values and to said operating status reference quantity for modifying the value stored in said memory location indicating means, said modified value additionally representing the value of said operating status reference quantity corresponding to a particular sequence-calling value determined operation of said calculator.

means for storing said modified value in said first memory, and means responsive to completion of the operation according to said corresponding stored sequence of instructional values and to said modified value for determining selection of successive control words for subsequent operation of said calculator.

9. The calculator as claimed in claim 1 and further including reference storage means for storing reference quantities, and wherein said computation means includes means for responding to at least one reference quantity stored in said reference storage means for determination of the next control word to be processed.

10. The calculator of claim 9 wherein said one reference quantity represents an instructional value initiating source, said one reference quantity having a first value indicating said instructional value initiating source was said keyboard, and a second value indicating said instructional value initiating source was said first memory.

11. In a keyboard responsive calculator, computation means for manipulating numerical values and producing results of such manipulations, display means connected to said computation means, said display means having first and second groups of display positions, said first group of display positions normally displaying a series of the most significant digits of the value of the result of a manipulation by said computation means, storage means connected to said computation means for storing a predetermined number of digits of a result produced by said computation means, said storage means having a first group of digit storage cells corresponding in number to the number of the display positions in said first group of display positions, and a second group of digit storage cells for storing those digits of a result that exceed said number of display positions, manual key means, and means responsive to said manual key means for operating said display means to display in said second group of display positions digits of said result stored in said second group of digit storage cells.

12. A programmable desk type calculator comprising computation means having an input register, a plurality of registers for storing numerical values, an arithmetic unit for operating on numerical values stored in said registers in accordance with instructional values and producing a result, and bus means connecting said input register and said arithmetic unit to said plurality of registers, a keyboard connected to said input register of said computation means, said keyboard having a plurality of manually operable first key elements for entering numerical values into said input register of said computation means, a plurality of manually operable second key elements for entering instructional values into said input register of said computation means, and a manually operable subroutine key for entering a subroutine designation into said input register of said computation means, a first memory having first register means connected to said arithmetic unit for storing the value of the result of an operation by said computation means, second register means for storing a sequence of said instructional values, and third register means for storing second register address information for use in controlling the execution of a sequence of instructional values by said computation means, display means connected to said first register means, said display means having a predetermined number of display positions for displaying the result of an operation by said computation means, a status indicator, means connected to said keyboard for setting said status indicator to a first value when said calculator is executing a subroutine initiated in response to operation of said subroutine ky, means connected to said first memory for setting said status indicator to a second value when said calculator is executing a subroutine initiated in response to a subroutine designation stored in said sequence of instructional values, and means responsive to said status indicator upon completion of a subroutine for determining the next operation of said calculator.

13. The calculator as claimed in claim 12 and further including internal memory location indicating means for generating and storing a value representing the location within said first memory of the instructional value currently accessible for controlling the operation of said calculator, and means connected to said first memory and responsive to a subroutine designation and the setting of said status indicator for modifying the value stored in said memory location indicating means, means for storing said modified value and means responsive to completion of the specified subroutine and said modified value for determining the subsequent operation of said calculator.

14. The calculator as claimed in claim 13 and further including a second memory for storing a plurality of predetermined control words, each said predetermined control word including first field for determining the source of one input to said arithmetic unit, a second field for determining the source of a second input to said arithmetic unit, a third field for determining the destination of data transferred from said arithmetic unit, and a fourth field for specifying the mode of operation of said arithmetic unit, a fifth field for controlling transfer of data to and from said first memory, and a sixth field for use in determining the next control word to be processed, said computation means including means responsive to the fields of said control words for controlling the operation of said computation means, means responsive to an instructional value for selecting a series of control words for causing said computation means to perform the operation specified by said instructional value, and means for successively applying said control words to said computation means to perform said specified operation.

15. The calculator as claimed in claim 14 wherein said display means has first and second groups of display positions, said first group of display positions normally displaying a series of the most significant digits of the value of the result of a manipulation by said computation means, storage means connected to said computation means for storing a predetermined number of digits of a result produced by said computation means, said storage means having a first group of digit storage cells corresponding in number to the number of the display positions in said first group of display positions, and a second group of digit storage cells for storing those digits of a result that exceed said number of display positions, manual key means, and means responsive to said manual key means for operating said display means to display in said second group of display positions digits of said result stored in said second group of digit storage cells.

16. A programmable desk type calculator comprising computation means having an input register, a plurality of registers for storing numerical values an arithmetic unit for operating on numerical values stored in said registers in accordance with instructional values and producing a result, and bus means connecting said input register and said arithmetic unit to said plurality of registers, a keyboard connected to said input register of said computation means, said keyboard having a plurality of manually operable first key elements for entering numerical values into said input register of said computation means, and a plurality of manually operable second key elements for entering instructional values into said input register of said computation means, a first memory having first register means connected to said arithmetic unit for storing the value of the result of an operation by said computation means, second register means for storing a sequence of said instructional values, and third register means for storing second register address information for use in controlling the execution of a sequence of instructional values by said computation means, display means connected to said first register means, said display means having a predetermined number of display positions for displaying the result of an operation by said computation means, a seocnd memory for storing a plurality of predetermined control words, each said predetermined control word including a predetermined set of fields, said fields including a plurality of computation means control fields and a further field for use in determining the next control word to be processed, address setting means connected between said computation means and said second memory, said second memory being addressable only from said computation means through said address setting means, said computation means including means responsive to the control fields of each control word for controlling the operation of said computation means, one of said control fields of each said control word controlling the transfer of numerical values to said arithmetic unit from said registers, a second of said control fields of each said control word controlling transfer of numerical values from said arithmetic unit to said registers, means for successively applying the control words in said series to said computation means to perform said specified operation, storage means connected to said computation means for storing a predetermined number of digits of a result produced by said computation means, said storage means having a first group of digit storage cells corresponding in number to the number of said display positions, and a second group of digit storage cells for storing those digits of a result that exceed said number of display positions, manual key means, and means responsive to said manual key means for operating said display means to display the digits of said result stored in said second group of digit storage cells.

* * * * *

UNITED STATES PATENT OFFICE
CERTIFICATE OF CORRECTION

Patent No. 3,760,171 Dated September 18, 1973

Inventor(s) An Wang, Harold Stanley Koplow and Shu-Kuang Ho

It is certified that error appears in the above-identified patent and that said Letters Patent are hereby corrected as shown below:

Col. 4, line 33, "(Y-Register)" should be --(X-Register)--.

Col. 6, line 2, after "of" insert --the--.
line 15, change second "in" to --of--.

Col. 9, line 20, "(stat)" should be underlined.
line 61, "incororated" should be --incorporated--.

Col. 10, lines 13 and 14 "bi" should be underlined.
line 25 "zo" should be underlined.
line 53 "bd" should be underlined.
line 57 "ac" should be underlined.

Col. 16, line 10, "sent" is misspelled.
line 28, "after" should be underlined.
line 33, "control" is misspelled.
line 61, "on" should be underlined.

Col. 17, line 30, "on" should be underlined.
line 66, "bh" should be underlined.

Col. 18, line 3, "on" should be underlined.
line 6, "one" should be underlined.

Col. 21, line 38, "highorder" should be two words.
line 67, "not" should be underlined.

FORM PO-1050 (10-69)

USCOMM-DC 60376-P69
★ U.S. GOVERNMENT PRINTING OFFICE : 1969 O—366-334.

UNITED STATES PATENT OFFICE

CERTIFICATE OF CORRECTION

Patent No. 3,760,171 Dated September 18, 1973

Inventor(s) An Wang, Harold Stanley Koplow and Shu-Kuang Ho

It is certified that error appears in the above-identified patent and that said Letters Patent are hereby corrected as shown below:

Col. 22, lines 21-22, delete "memory 180 will be searched to find the subroutine "00".
line 26, after "which", insert --memory 180 will be searched to find the subroutine "00"--.

Col. 23, line 6, "remains" should be --remained--.
line 64, "in" first occurrence, should read -- is --.

Col. 24, line 13, "the" should be --this--.
line 16, "1000" should be underlined and the "0000" should be right underneath the "<u>1000</u>".

Col. 25, lines 13 and 14, "previously" should read -- previous --

Col. 26, line 35, "plus" and "minus" should be underlined.
line 37, "in" first occurrence, should read -- is --.
line 41, "on" should be underlined.

Col. 27, line 12, "either" is misspelled.
line 22, "lower" should be --low--.
line 24, "causes" should be --cause--.

Col. 28, line 65 "+2" should be --+02--.

Col. 29, line 1, "of" should be --on--.
line 68, "812" should be --8012--.

ORM PO-1050 (10-69)

USCOMM-DC 60376-P69
★ U.S. GOVERNMENT PRINTING OFFICE : 1969 O—366-334.

UNITED STATES PATENT OFFICE

CERTIFICATE OF CORRECTION

Patent No. 3,760,171 Dated September 18, 1973

Inventor(s) An Wang, Harold Stanley Koplow and Shu-Kuang Ho

It is certified that error appears in the above-identified patent and that said Letters Patent are hereby corrected as shown below:

Col. 30, line 5, "Prime" should be --PRIME--.
line 10, "That" should be --The--.
line 39, "remainder" should be underlined.

Col. 31, line 27, "work" should be --word--.
line 34, "work" should be --word--.
line 36, "work" should be --word--.
line 42, "work" should be --word--.
line 46, "address" is misspelled.

Col. 32, line 11, after "said" insert --one--.
line 25, "work" should be --word--.
line 28, "designating" is misspelled.

Col. 35, line 36 "second" is misspelled.

Signed and sealed this 7th day of May 1974.

(SEAL)
Attest:

EDWARD M.FLETCHER,JR.
Attesting Officer

C. MARSHALL DANN
Commissioner of Patents

FORM PO-1050 (10-69)
USCOMM-DC 60376-P69
☆ U.S. GOVERNMENT PRINTING OFFICE : 1969 O—366-334